(12) United States Patent
Toda et al.

(10) Patent No.: US 6,989,721 B2
(45) Date of Patent: Jan. 24, 2006

(54) ADAPTIVE CONTROLLER AND ADAPTIVE CONTROL METHOD THAT CAN ADAPTIVELY CONTROL A PLURALITY OF VARIABLE HIGH FREQUENCY DEVICES AT HIGH SPEED

(75) Inventors: Takeshi Toda, Kawasaki (JP); Yuuta Nakaya, Kawasaki (JP); Yasuyuki Oishi, Kawasaki (JP); Kaoru Yokoo, Kawasaki (JP); Shinsuke Hara, Suita (JP); Yuji Irie, Suita (JP)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 10/803,699

(22) Filed: Mar. 18, 2004

(65) Prior Publication Data

US 2004/0239436 A1 Dec. 2, 2004

(30) Foreign Application Priority Data

| May 29, 2003 | (JP) | ............................. 2003-153181 |
| Sep. 1, 2003 | (JP) | ............................. 2003-308733 |
| Nov. 26, 2003 | (JP) | ............................. 2003-395629 |

(51) Int. Cl.
*H03H 21/00* (2006.01)
*H03H 7/40* (2006.01)

(52) U.S. Cl. ..................... 333/17.3; 333/100; 455/63
(58) Field of Classification Search ............... 333/17.3, 333/100; 455/63
See application file for complete search history.

(56) References Cited

U.S. PATENT DOCUMENTS 6,782,257 B1 * 8/2004 Moustakas et al. ......... 455/423
6,823,174 B1 * 11/2004 Masenten et al. .......... 455/63.4

FOREIGN PATENT DOCUMENTS

JP   2002-118414   4/2002

OTHER PUBLICATIONS

Jun Cheng, et al., Adaptive Beamforming of ESPAR Antenna Based on Steepest Gradient Algorithm. IEICE Trans. Commun. vol.E84-B, No. 7 Jul. 2001.

* cited by examiner

*Primary Examiner*—Stephen E. Jones
(74) *Attorney, Agent, or Firm*—Katten Muchin Rosenman LLP

(57) ABSTRACT

An adaptive controller adaptively controls a plurality of variable high frequency devices. A calculation part calculates a scalar function value by using a signal varied in accordance with impedances of the variable high frequency devices, a reference signal, and a predetermined scalar function. An impedance variation part creates a signal that sequentially varies the impedances of the variable high frequency devices. A determination part determines, when the impedance of one of the variable high frequency devices is varied, whether a direction in which the scalar function value is varied is in a predetermined sloped direction. The impedance variation part includes a first variation part that, when a decision result in the determination part is in the predetermined direction, creates a signal that further varies the impedance of the one of the variable high frequency devices in the predetermined sloped direction. The impedance variation part also includes a second variation part that, when the decision result in the determination part is not in the predetermined sloped direction, creates one of a signal that varies the impedance of the one of the variable high frequency devices in an oppositely sloped direction and a signal that varies the impedance of another one of the variable high frequency devices.

19 Claims, 14 Drawing Sheets

ADAPTIVE CONTROLLER AND ADAPTIVE CONTROL METHOD THAT CAN ADAPTIVELY CONTROL A PLURALITY OF VARIABLE HIGH FREQUENCY DEVICES AT HIGH SPEED

BACKGROUND OF THE INVENTION

1. Field of the Invention

The present invention generally relates to adaptive control, and more particularly, to an adaptive controller and an adaptive control method for adaptively controlling at high speed a plurality of variable high frequency devices (hereinafter, the "variable high frequency devices" refers to high frequency devices whose impedances are variable).

2. Description of the Related Art

In the above-mentioned kind of field, based on a signal varied depending on the impedances of a plurality of high frequency devices, each impedance is adaptively controlled to an optimum value. In a communication environment varied with time, for example, good wireless communication is performed by adaptively controlling impedances of high frequency devices such as capacitors and inductors associated with a plurality of antenna elements.

FIG. 1 shows such an adaptive control system. In this example, each of M antenna elements 102 is connected to a high frequency device 104. High frequency devices 104 are capable of varying the respective impedances $z_1$ through $z_{2M}$ in accordance with control signals $x_1$ through $x_{2M}$. The M antenna elements 102 are connected to a combiner 106. The output of the combiner 106 is supplied to an adaptive controller 108. Signals received by the respective antenna elements 102 are combined under influences of the impedances $z_1$ through $z_{2M}$ of the respective high frequency devices 104 and are introduced in the adaptive controller 108. In the adaptive controller 108, by using an appropriate optimizing algorithm, the control signals $x_1$ through $x_{2M}$ are created such that a signal from the combiner 106 has a desired characteristic, thereby varying the respective impedances. Hence, it becomes possible to suppress only interference waves and process only desired waves in the subsequent stages among a plurality of arriving waves that are received by the antenna elements 102.

FIG. 2 shows a conventional control flow 200 that can be used in an adaptive controller. The method is an optimizing method using a perturbation method. The control flow 200 starts in step 202. In step S204, impedances $z_i$ of a plurality of elements (inductors $L_i$ and capacitors $C_i$) or control signals $x_i$ for setting them are set to appropriate initial values. In step S206, the value of a parameter m for indicating an element that is subject to control is set to an initial value 0.

In step S208, the value of an evaluation function f(z) varied depending on an output signal y(z) ($Z=(z_1, z_2, \ldots z_{2M})$) from the combiner 106 is calculated. The value of the evaluation function f(z) is stored in a memory as a reference value fo(z). Various functions may be adopted as the evaluation function f(z). It is possible, for example, to adopt a function representing the coincidence of received signals y and known signals (preambles) r that are inserted into a transmission signal at regular intervals as follows.

$$f = |y^H r|/(\sqrt{y^* y} \sqrt{r^* r})$$

In this case, H represents obtaining an Hermitian conjugate (to obtain a complex conjugate by transposing a vector). The above equation is equivalent to calculation of an inner product or a scalar product of a standardized received signal y and a standardized known signal r. Accordingly, the value of the function f(z) is a real value having the absolute value of 1 or less: when the received signal y and the known signal r match, the value of the function f(z) is 1, and when the received signal y and the known signal r are orthogonal, the value of the function f(z) is 0.

In step 210, the value of the parameter m is incremented by 1.

In step 212, the value of impedance $z_m$ of the "m"th element is varied to $z_m + \Delta z_m$. When the value of "m" is 1, for example, the value of an inductor $L_1$ is slightly varied. The slight variation $\Delta z_m$ in the impedance $z_m$ results in variation in the output signal y(z).

In step 214, the value of the evaluation function E f(z) is calculated by using the frame next to the frame used in the calculation in step 208.

In step 216, a gradient vector $\nabla f$ is calculated by calculating the difference between the values of the evaluation function f(z) before and after the variation with respect to the impedance $z_m$. $\nabla f$ is a vector quantity having 2M components, and each component is calculated by the following equation.

$$(\nabla f)_{zm} = f(z_1, \ldots, z_m + \Delta z_m, \ldots, z_{2M}) - f_0(z_1, \ldots, z_m, \ldots, z_{2M})$$

In step 218, the value of the slightly varied $z_m$ is returned to the value before the slight variation.

In step 220, it is determined whether the value of the parameter m is 2M or less. When the value of the parameter m is 2M or less (YES in step 220), the flow returns to step 208, and another component of the gradient vector $\nabla f$ is calculated. On the other hand, when the value of the parameter m is not 2M or less (NO in step 220), i.e., greater than 2M, which means all components of the gradient vector $\nabla f$ are calculated, the flow proceeds to step 222.

In step 222, the value of the impedance $z_i$ of each element is updated by using the gradient vector $\nabla f$. The gradient vector $\nabla f$ indicates the direction in which the gradient (inclination) is most drastically varied from a coordinate (z1, z2, ..., z2M) on an f surface. Accordingly, it is possible to approach the maximum or minimum value (a desired optimum value) of the evaluation function f(z) by advancing in the direction indicated by $\nabla f$ from the coordinate. A parameter α represents the step width in advancing along $\nabla f$ when updating the value of the impedance $z_i$. In the aforementioned manner, the value of the impedance $z_i$ is updated.

In step 224, it is determined whether sufficient convergence is obtained by comparing the value of the previous impedance with that of the updated impedance. When sufficient convergence is not obtained (NO in step 224), the flow returns to step 206. When sufficient convergence is obtained (YES in 224), the flow proceeds to step 226 where the control flow 200 ends.

Methods for optimizing impedance by calculating the gradient vector $\nabla f$ by using a perturbation method and sequentially updating the impedance as mentioned above are described in, for example, Japanese Laid-Open Patent Application No. 2002-118414, and Jun Cheng, Yukihiro Kamiya, and Takashi Ohira, "Adaptive Beamforming of ESPAR Antenna Based on Steepest Gradient Algorithm", IEICE TRANS. COMMUN., VOL.E84-B, No. 7, Jul. 2001.

The high frequency devices 104, which are used in conventional adaptive control systems, are generally formed by semiconductor devices such as, varactor diodes in light of high-speed operations. It is possible to cause such a kind of semiconductor devices to perform a vary high speed operation, i.e., to vary the impedance in a very short time interval, for example, in $10^{-12}$ seconds. However, such semiconductor devices have a problem in that comparatively a great deal of electric power is consumed. In addition, such semiconductor devices have problems in that insertion loss may be high, isolation characteristics may be low, and cost may be high, for example. Accordingly, it is not easy to perform adaptive control as mentioned above by mounting such a kind of semiconductor devices on a small electronic device.

On the other hand, with the progress in silicon processing technologies, technologies referred to as Micro Electro Mechanical System (MEMS) or Nano Electro Mechanical System (Nano EMS) are attracting attention these days. An Electro Mechanical System (hereinafter referred to as an "EMS") in the order of micrometers or nanometers is a minute mechanical system having a size of approximately micrometers or nanometers. It is possible to build a variable high frequency device using an EMS by, for example, mechanically varying the distance between the polar plates of a capacitor, or by varying the insertion amount of a magnetic core of an inductor. Variable high frequency devices or variable impedance devices using EMSs are advantageous in isolation characteristics, insertion loss, costs, and the like, as-well as in having an electric power consumption less than that of semiconductor devices, which mainly results from mechanical operations thereof.

However, it is necessary for variable high frequency devices using EMSs to move moving parts thereof so as to vary impedance. For this reason, such variable high frequency devices are disadvantageous in that the working speed thereof is slower than that of semiconductor devices. Suppose the high frequency device 104 is formed by four elements each using an EMS, and each of the elements requires 100 µs to vary the impedance, for example. In this case, each of the elements requires 200 µs for varying the impedance twice in steps 212 and 222. Consequently, the update of impedance in step 222 is performed only once in (twice×4 elements+1 (for updating))×100 µs=900 µs.

On the other hand, suppose the high frequency element 104 is formed by four elements each using an EMS and being capable of varying the impedance at a comparatively high speed such as 4 µs, though which speed is slower than that of semiconductor devices. In this case, in theory, it is possible to perform the update of impedance in step 222 once in (twice×4 elements+1 (for updating))×4 µs=36 µs. However, the calculations of the value of the evaluation function in steps 208 and 214 use the known signals included in frames. Thus, it is not always possible to update the impedance at high speed as such. Even in a high speed wireless LAN standard such as. IEEE802.11a, for example, merely 8 µs preamble is obtained for each frame of 20 µs. Accordingly, in the above-mentioned case, the update of impedance in step 222 is performed only once in (twice×4 elements+1 (for updating))×20 µs=180 µs (9 frames).

SUMMARY OF THE INVENTION

A general object of the present invention is to provide an improved and useful adaptive controller and adaptive control method in which one or more of the above-mentioned problems are eliminated.

Another and more specific object of the present invention is to provide an adaptive controller and an adaptive control method that can adaptively control at high speed a plurality of variable high frequency devices (high frequency devices whose impedances are variable) formed by Electro Mechanical Systems.

Still another object of the present invention is to provide an adaptive controller and an adaptive control method that can adaptively control at high speed a plurality of variable high frequency devices formed by Electro Mechanical Systems by using payloads following preambles in frames.

In order to achieve the above-mentioned objects, according to one aspect of the present invention, there is provided an adaptive controller for adaptively controlling a plurality of variable high frequency devices, the adaptive controller including:

a calculation part that calculates a scalar function value by using a signal varied in accordance with impedances of the variable high frequency devices, a reference signal, and a predetermined scalar function;

an impedance variation part that creates a signal that sequentially varies the impedances of the variable high frequency devices; and a determination part that, when an impedance of one of the variable high frequency devices is varied, determines whether a direction in which the scalar function value is varied is in a predetermined sloped direction, the impedance variation part including:

a first variation part that, when the determination part determines the direction in which the scalar function value is varied is in the predetermined sloped direction, creates a signal that further varies the impedance of the one of the variable high frequency devices in the predetermined sloped direction; and a second variation part that, when the determination part determines the direction in which the scalar function value is varied is not in the predetermined sloped direction, creates one of a signal that varies the impedance of the one of the variable high frequency devices in an oppositely sloped direction and a signal that varies an impedance of another one of the variable high frequency devices.

According to the present invention, it is possible to adaptively control at high speed a plurality of variable high frequency devices formed by Electro Mechanical Systems.

Other objects, features and advantages of the present invention will become more apparent from the following detailed description when read in conjunction with the following drawings.

DETAILED DESCRIPTION OF THE PREFERRED EMBODIMENTS

Figure 3:
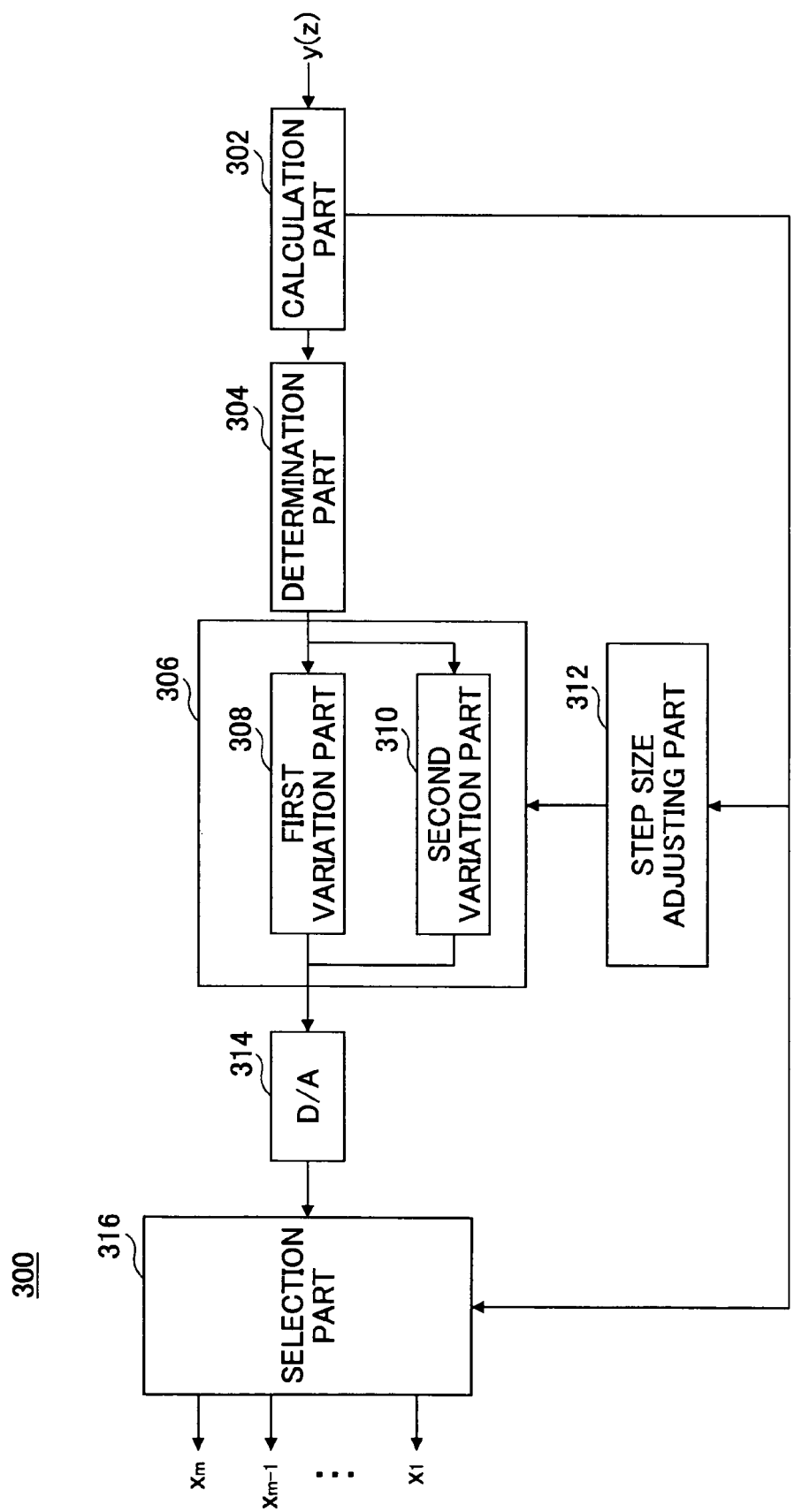
FIG. 3 is a block diagram relating to major functions of an adaptive controller according to one embodiment of the present invention.

FIG. 3 is a block diagram relating to major functions of an adaptive controller 300 according to one embodiment of the present invention.

Figure 1:
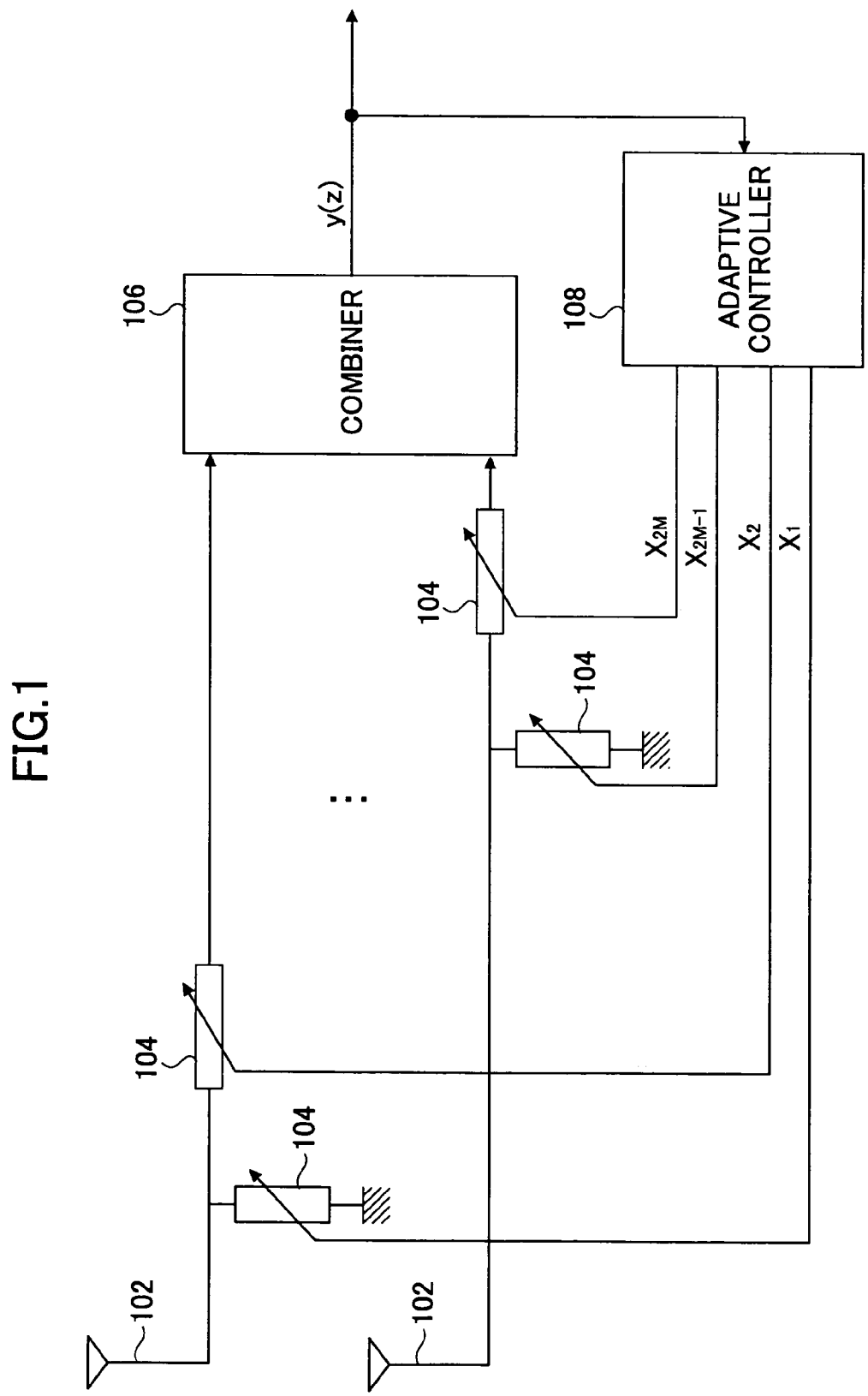
FIG. 1 is a block diagram showing an adaptive control system.

The adaptive controller 300 may be used instead of, for example, the adaptive controller 108 shown in FIG. 1. However, the present invention may be applied not only to such adaptive array antenna systems but also to arbitrary non-linear systems that adaptively control a plurality of variable high frequency devices (the "variable high frequency devices" refers to high frequency devices whose impedances are variable). For simplicity, it is assumed that the total number of variable high frequency devices that are subject to control is M, and the digital received signal y(z) from the combiner 106 is input to the adaptive controller 300.

The adaptive controller 300 includes a calculation part 302. The calculation part 302 receives the digital received signal y(z), and calculates the value of a predetermined evaluation function E(n). The evaluation function E(n) is a scalar function calculated by using a known signal and a digital received signal y(z) (z=($z_1$, . . . , $z_M$)) that is varied depending on impedances $z_i$ (i=1 through M) of the plurality of variable high frequency devices. The known signal is a signal that is predetermined in a transmitting source and a receiving end.

Figure 4:
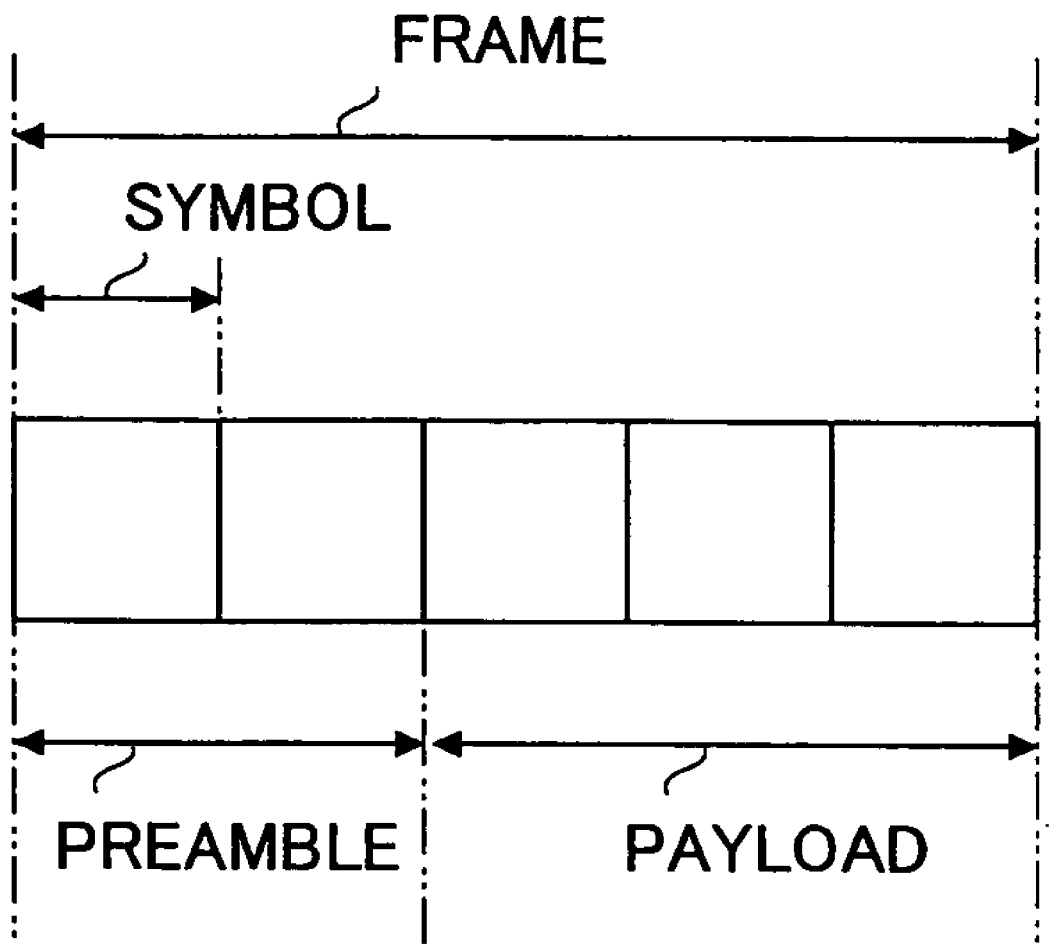
FIG. 4 is a schematic diagram showing a signal form used in the embodiment.

FIG. 4 shows a signal format used in this embodiment. The signal format includes successive frames. For convenience of explanation, it is assumed that a frame of 20 $\mu$s includes 5 symbols of 4 $\mu$s; 2 symbols are allocated to a preamble (8 $\mu$s) and the subsequent 3 symbols are allocated to a payload. The above-mentioned known signal is inserted into the preamble of a transmission signal employing the signal format.

Figure 2:
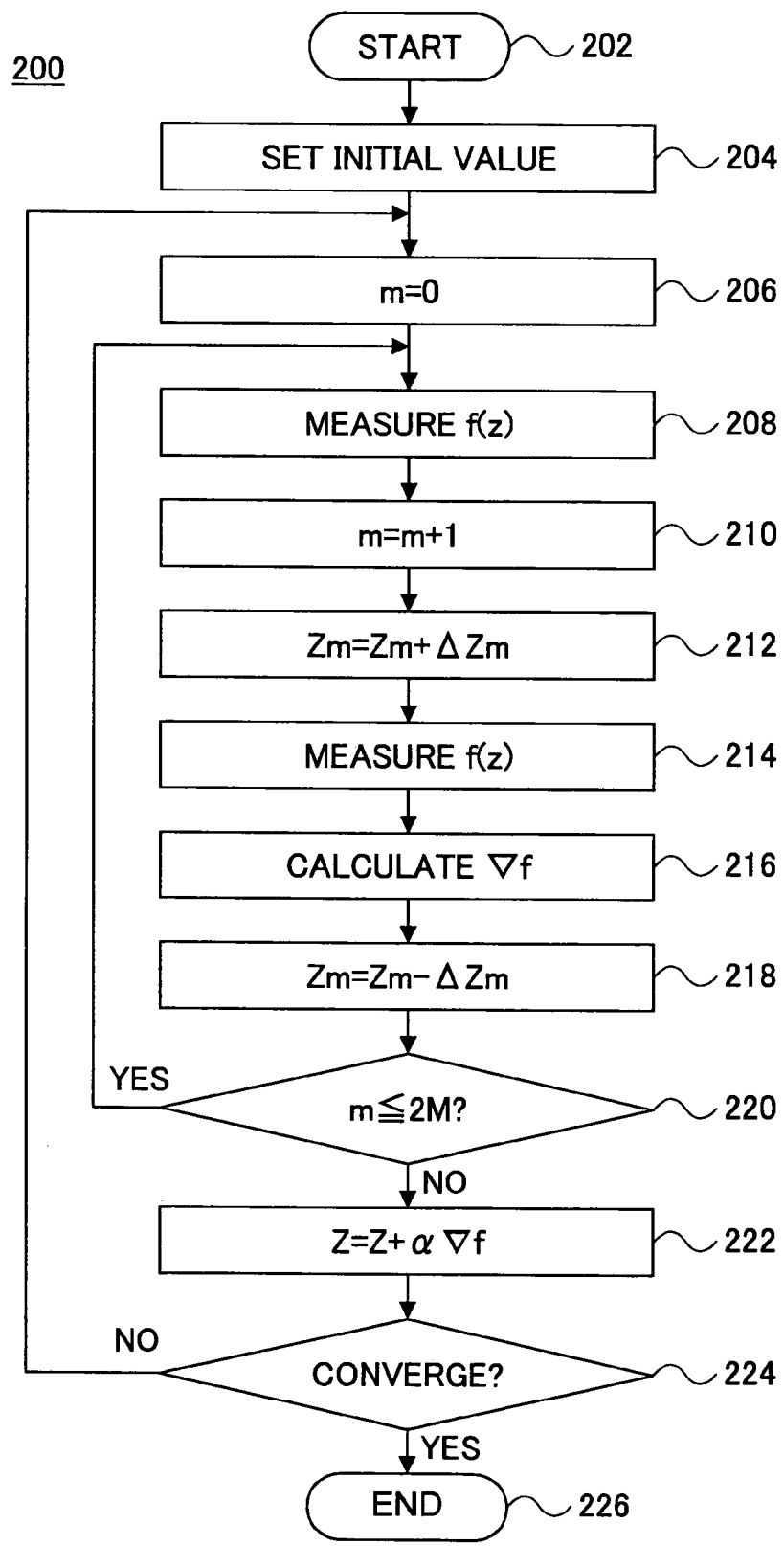
FIG. 2 is a flow chart showing a conventional control flow.

Referring to FIG. 3, various forms may be adopted as the form of the evaluation function E that is calculated in the calculation part 302. For simplicity, the inner product of a standardized received signal and a known signal, which is used in steps 208 and 214 in FIG. 2, is used as the evaluation function E. Accordingly, the evaluation function E is varied depending on the number (n) of frames and an impedance vector z(n). It is also possible to use, for example, the absolute value of the difference between the received signal and the known signal as another form of the evaluation function E.

The adaptive controller 300 also includes a determination part 304 connected to an output of the calculation part 302. The determination part 304 determines the direction (increasing direction or decreasing direction) in which the scalar function value is varied. When the impedances of the variable high frequency devices are varied, the digital received signals are varied accordingly, and the scalar function value calculated in the calculation part 302 is also varied. The determination part 304 determines whether the variation of the scalar function value is in the increasing direction or the decreasing direction. The determination method includes various methods. It is possible to accurately determine the variation direction by determining whether sequentially obtained K scalar function values are continuously increased or decreased, for example.

The adaptive controller 300 also includes an impedance variation part 306 connected to an output of the determination part 304. The impedance variation part 306 creates signals for varying the impedances of the variable high frequency devices. The impedance variation part 306 includes a first variation part 308 that further varies the impedances of the variable high frequency devices in the same direction in accordance with a determination result in the determination part 304. That is, if a variation in the scalar function value calculated in the calculation part 302 results from increasing the impedance $z_i$ of a given variable high frequency device, the first variation part 308 creates a control signal that further increases the impedance $z_i$ of the variable high frequency device under a specific condition (that is described later). On the other hand, when a variation in the scalar function value results from decreasing the impedance $z_i$ of a given variable high frequency device, the first variation part 308 creates a control signal that further decreases the impedance $z_i$ of the variable high frequency device under a specific condition.

Figure 6:
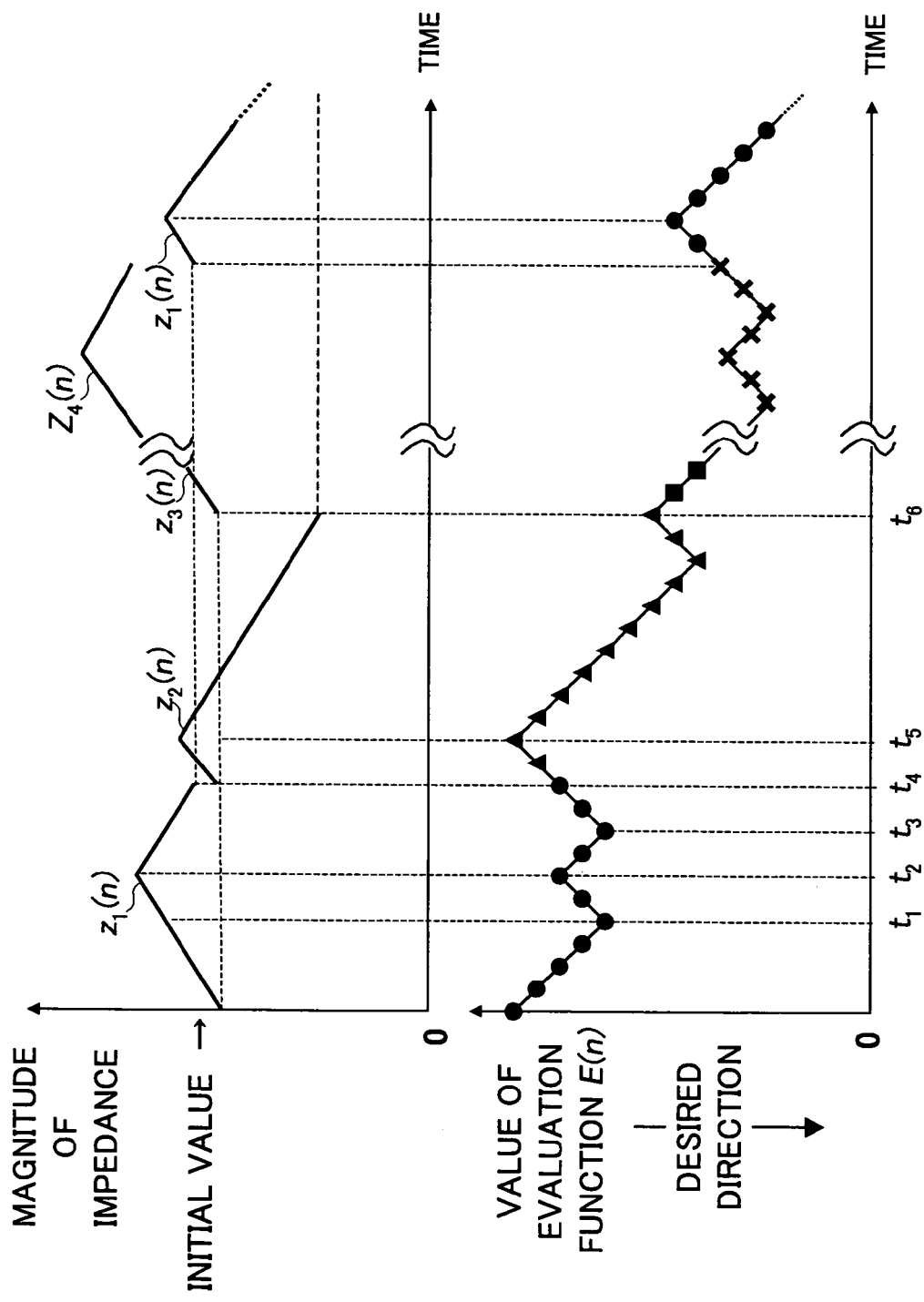
FIG. 6 is a graph showing conditions in which impedance and value of an evaluation function are varied in accordance with the control flow shown in FIG. 5.
Figure 9:
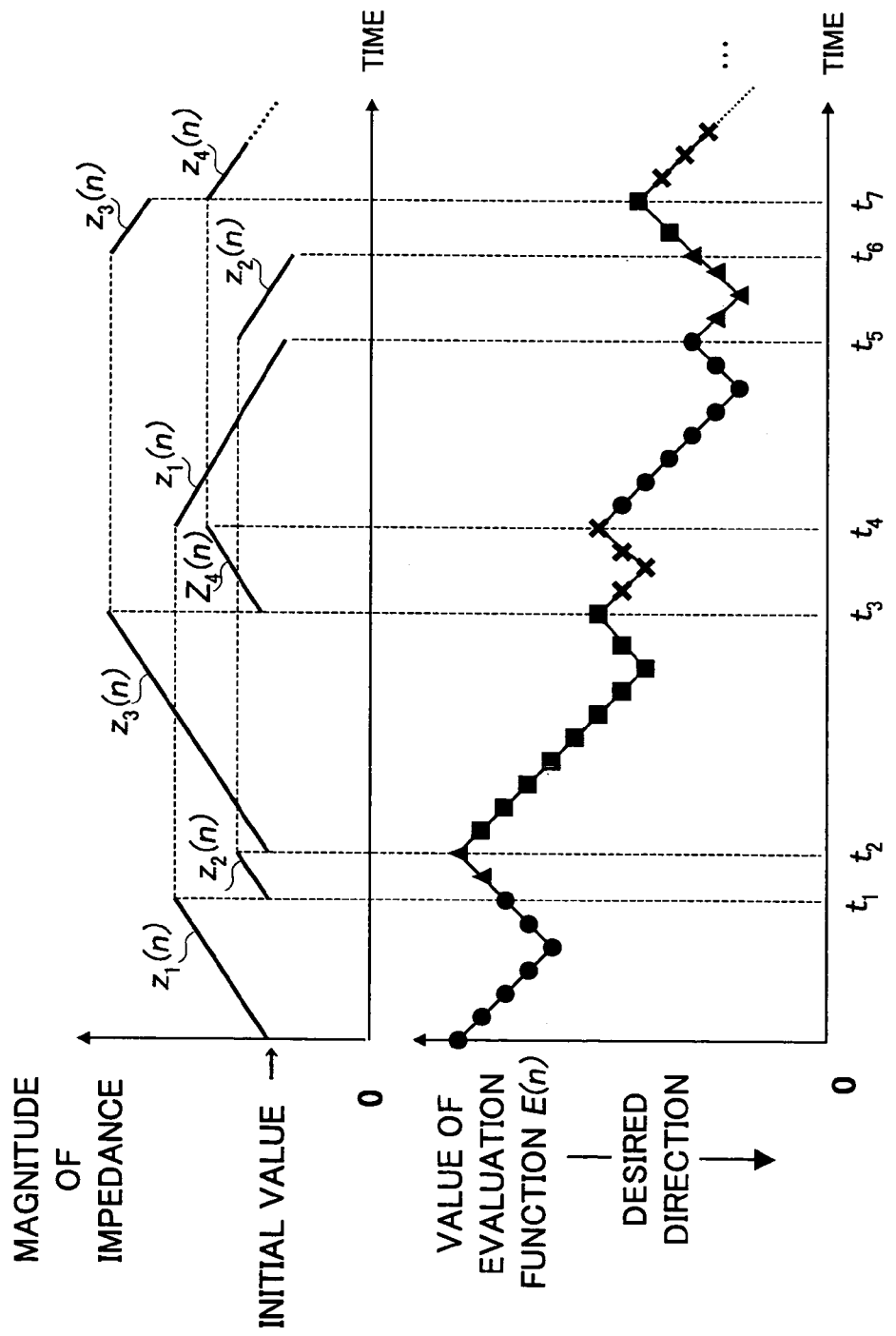
FIG. 9 is a graph showing conditions in which the impedance and the value of an evaluation function are varied in accordance with the control flow shown in FIG. 8.

The impedance variation part 306 also includes a second variation part 310. In accordance with a determination result in the determination part 304, the second variation part 310 varies the impedance of a variable high frequency device in an oppositely sloped direction (for example, in a negatively sloped (decreasing) direction from a positively sloped (increasing) direction, or in a positively sloped direction from a negatively sloped direction as shown in FIGS. 6 and 9, described later) or varies the impedance of another variable high frequency device. When a variation in the scalar function value calculated in the calculation part 302 results from increasing (or decreasing) the impedance $z_i$ of a given variable high frequency device, for example, the second variation part 310 creates a control signal that decreases (or increases) the impedance $z_i$ of the variable high frequency device under a specific condition (that is described later). Further, in accordance with the determination result in the determination part 304, the second variation part 310 creates a signal that varies the impedance $z_{i+1}$ of another variable high frequency device (that is different from the given variable high frequency device) under the specific conditions.

The adaptive controller 300 also includes a step size adjusting part 312. Based on information (especially a frame number n) obtained from the calculation part 302, the step size adjusting part 312 properly adjusts a variation amount $\Delta z_i(n)$ of impedance in the impedance variation part 306.

The adaptive controller 300 also includes a digital/analog converter (D/A) (signal form conversion means) 314 connected to an output of the impedance variation part 306. The digital/analog converter converts a digital signal from the impedance variation part 306 to an analog signal.

The adaptive controller 300 also includes a selection part 316 connected to an output of the digital/analog converter 314. The selection part 316 supplies the output of the digital/analog converter 314 to one of the variable high frequency devices as a control signal $x_i$ (i=1, ..., M). The variable high frequency device that receives the control signal $x_i$ adjusts the impedance value thereof by mechanically moving a moving part thereof in accordance with the contents of the received control signal $x_i$.

Figure 5:
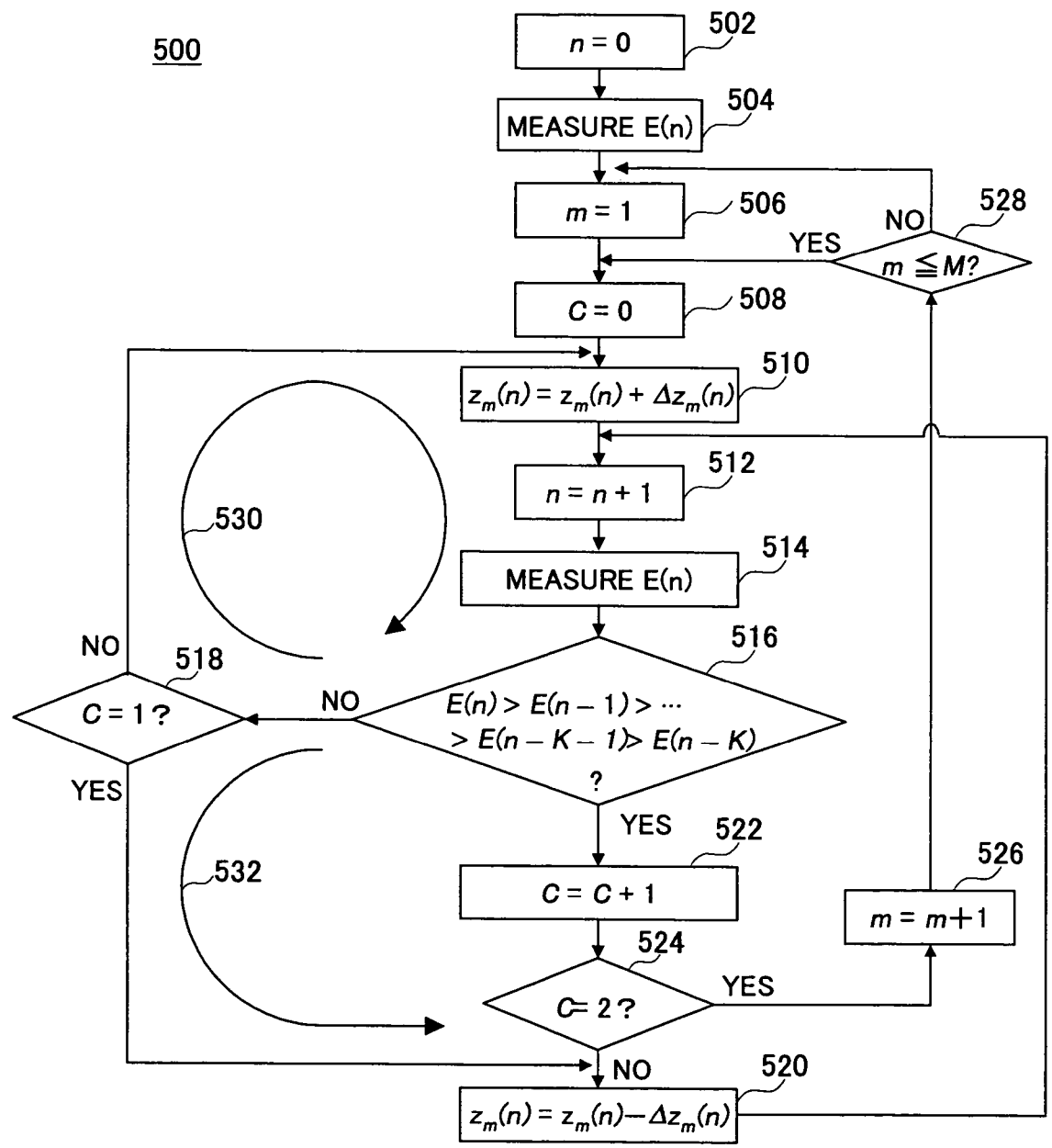
FIG. 5 is a flow chart showing an operation of the adaptive control system according to the embodiment.

FIG. 5 is a flow chart showing a control flow 500 of an adaptive control system according to one embodiment of the present invention. For simplicity, in this embodiment, it is assumed that the impedance of each element is adaptively controlled such that the evaluation function E is minimized. However, in another embodiment, control for obtaining the maximum value of the evaluation function E may be performed. The total number of variable high frequency devices that are subject to control is assumed to be 4 (M=4, m=1, ..., M). However, the present invention may be applied to a system that not only maximizes a value of an evaluation function but also minimizes the value of the evaluation function. In addition, the number of elements that are subject to control may be an arbitrary number.

In step 502, the frame number n is set to an initial value 0 (n=0).

In step 504, the value (E(n=0)) of the evaluation function E is calculated in the calculation part 302 (FIG. 3).

In step 506, an element number m is set to 1, and among the four variable high frequency devices, the first device is designated (m=1).

In step 508, the value c of an increase/decrease counter is set to 0 (c=0). The value of the increase/decrease counter in this embodiment is 0, 1, or 2. As is described below, c=0 represents that the direction in which impedance is varied is the increasing direction, c=1 represents that the direction in which impedance is varied is the decreasing direction, and c=2 represents that impedance of another element that is different from a current element is varied.

In step 510, the impedance of a currently designated variable high frequency device is increased by a predetermined amount. The variation of the impedance may be a constant value that is not dependent on the frame number n, or a value that is dependent on the frame number n. Additionally, the variation of the impedance may be an identical value with respect to all variable high frequency devices, or a different value for each variable high frequency device. In any case, the variation of the impedance is properly set in the step size adjusting part 312 (FIG. 3). In a case where both magnitude (absolute value) and phase of the impedance are varied, it is necessary to separately set and adjust the variations thereof. For simplicity, it is assumed that the variation $\Delta z_m$ of impedance in this embodiment is a constant value that is not dependent on the variable high frequency devices and frames, and does not include a phase component.

In step 512, the frame number n is increased (incremented).

In step 514, the value of the evaluation function E is calculated. When m=1, by the operation in step 510, among the M variable high frequency devices, the impedance $z_1$ of the first device is varied by $\Delta zm$ in the plus direction. Resulting from this impedance variation, a digital received signal that is input to the calculation part 302 (FIG. 3) is also varied. In step 514, the value of the evaluation function E is calculated. It should be noted that the frame number n is updated in step 512 since a preamble inserted in each frame is used for calculating the value of the evaluation function E.

In step 516, it is determined whether the value of the evaluation function is varied in a predetermined desired direction. In this embodiment, the impedance of each variable high frequency device is varied such that the value of the evaluation function E is minimized. Thus, the desired direction is the direction in which the value of the evaluation function E is decreased. In step 516, it is determined whether the value of the evaluation function E is varied in the direction oppositely sloped with respect to the predetermined desired direction. Hence, in step 516, whether the value of the evaluation function E is increased is determined for K times in series. Specifically, whether or not $$E(n) > E(n-1) > \ldots E(n-K) \tag{A}$$

is satisfied is determined. Since K=2 in this embodiment, it is determined in step 516 whether three or more scalar function values are continuously increased. Even if K=1, it is also possible to determine the variation direction. In this case, however, it is merely determined whether E(n)>E(n−1) is satisfied. Thus, the determination is likely to be influenced by noise, for example. By increasing the value of K, it is possible to control such influence of noise and accurately determine the direction in which the value of the evaluation function is varied. When the value of K is increased, however, the number of times of comparing values is increased. Consequently, determination speed or response speed is reduced. In this case, it is advantageous to vary the value of K in accordance with the amount of noise included in a received signal. By setting the value of K larger when a signal-noise ratio (SNR) is low and setting the value of K lower when a SNR is high, for example, it is possible to increase the adaptation speed (improve convergence) while considering the influence of noise. When the condition (A) is not satisfied (NO in step 516), the flow proceeds to step 518.

In step 518, it is determined whether the value c of the increase/decrease counter is 1. When c=0 (NO in step 518), the flow returns to step 510. Then, steps 510 through 516 are performed: the impedance $z_1$ of a target variable high frequency device is increased in step 510, the frame number n is updated in step 512, the value of the evaluation function E is calculated in step 514, and whether the condition (A) is satisfied is determined in step 516. That is, as indicated by an arrow 530, the impedance $z_1$ of the variable high frequency device is continuously increased until the condition (A) is satisfied. When the condition (A) is satisfied in step 516 (when the value of the evaluation function E is increased twice in a consecutive manner) (YES in step 516), the flow proceeds to step 522.

In step 522, the value c of the increase/decrease counter is incremented by 1. In the current case, since c=0, the value c of the increase/decrease counter becomes 1 (c=1) in step 522.

In step 524, it is determined whether the value c of the increase/decrease counter is 2 (c=2). In the current case, since c=1 (NO in step 524), the flow proceeds to step 520.

In step 520, contrary to step 510, the impedance of the variable high frequency device is varied in the minus direction. Similarly to step 510, the step size adjusting part 312 properly adjusts how much the impedance is decreased. For simplicity, it is assumed that the variation $\Delta z_m$ of the impedance in this embodiment is a constant value irrespective of devices or frames. Then, the flow returns to step 512, where the frame number n is updated. The value of the evaluation function E is calculated in step 514, and the variation direction of the value of the evaluation function E is determined in step 516. When the value of the evaluation function E is decreased by the operation in step 520, the condition (A) is not satisfied. Thus, the flow proceeds to step 518.

In step 518, it is determined whether the value of the increase/decrease counter is 1. In the current case, the decision result in step 518 is YES, and the process proceeds to step 520. Then, similarly, steps 520 through 516 are performed: the impedance of the variable high frequency device is decreased in step 520, the frame number n is updated in step 512, the value of the evaluation function E is calculated in step 514, and the variation direction of the value of the evaluation function E is determined in step 516. That is, as indicated by an arrow 532, the impedance of the variable high frequency device is continuously decreased until the condition (A) is satisfied (until the value of the evaluation function E is increased twice in a consecutive manner). When the condition (A) is satisfied (YES in step 516), the flow proceeds to step 522.

In step 522, the value of the increase/decrease counter is further incremented by 1. In step 524, it is determined whether the value of the increase/decrease counter is 2. In the current case, the decision result in step 524 is YES. Thus, the process proceeds to step 526.

In step 526, the value of m is incremented by 1 so as to designate another variable high frequency device (m=2).

In step 528, it is determined whether the current value of m is the maximum value M or less. When the value of m is the maximum value M or less (YES in step 528), the flow returns to step 508. As in the case of the impedance $z_1$ of the variable high frequency device, an impedance $z_2$ of another variable high frequency device is increased and then decreased. When impedances of all variable high frequency devices are varied, m becomes larger than M (NO in step 528), and the flow proceeds to step 506. In step 506, the number of devices is reset to 1. Thereafter, a similar control procedure is performed. In the aforementioned manner, the impedance of each variable high frequency device is adaptively adjusted.

It should be noted that, for simplicity, a procedure for ending the control flow 500 is omitted from the flow chart shown in FIG. 5. As for the ending procedure, it is possible to end the control flow 500 when the value of the evaluation function E becomes smaller than a predetermined value, for example. Thereafter, the adaptive control system enters an operation mode in which the value of the evaluation function E is monitored. The control flow 500 may be resumed when the value of the evaluation function E becomes larger than a predetermined value, for example.

FIG. 6 shows states where the impedance $z_i$ (the upper portion of FIG. 6) and the value of the evaluation function E (the lower portion of FIG. 6) are varied in accordance with the control flow 500. The horizontal axis represents time or the number of frames. As shown in FIG. 6, the impedance of the first variable high frequency device is increased from time 0. Until time $t_1$, as the impedance $z_i$ is increased, the evaluation function E is also varied in the decreasing direction (a desired direction). Thereafter, the impedance $z_i$ is continuously increased until the evaluation function E is increased twice in a consecutive manner. Such a process relates to the loop indicated by the arrow 530 shown in FIG. 5. At time $t_2$, the evaluation function E is increased twice in a consecutive manner. Hence, the value of the increase/ decrease counter is increased, and the value of the impedance $z_1$ is decreased. Also in this case, the impedance $z_1$ is decreased until the evaluation function E is increased twice in a consecutive manner. Such a process relates to the loop indicated by the arrow 532 shown in FIG. 5.

At time $t_4$, since the evaluation function E is increased twice in a consecutive manner, the value of the increase/ decrease counter is further increased, and the impedance $z_2$ of another variable high frequency device is increased. At time $t_5$, since the evaluation function E is increased twice in a consecutive manner, the value of the increase/decrease counter is increased, and the value of the impedance $z_2$ is decreased. At time $t_6$, since the evaluation function E is increased twice in a consecutive manner, the value of the increase/decrease counter is increased, and an impedance $z_3$ of the next variable high frequency device is set to a target. Subsequently, the operation of increasing and decreasing impedance is performed in similar manners with respect to all variable high frequency devices.

Figure 7:
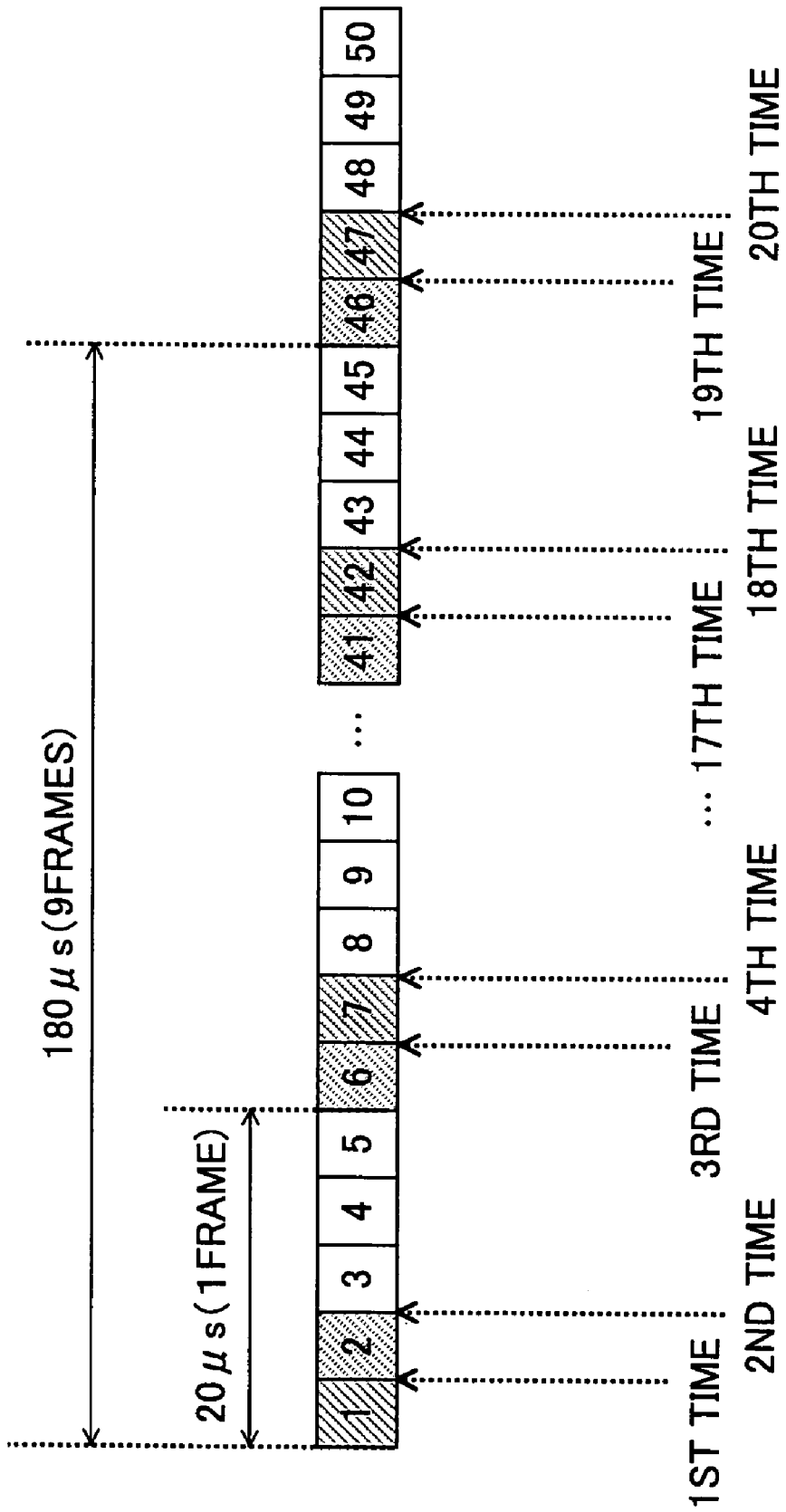
FIG. 7 is a schematic diagram showing time points at which impedance is updated according to the embodiment.

FIG. 7 shows time points at which impedance is updated according to this embodiment. As previously mentioned with reference to FIG. 4, a frame of 20 $\mu$s includes 5 symbols of 4 $\mu$s: 2 symbols are allocated to a preamble (8 $\mu$s), and the subsequent 3 symbols (12 $\mu$s) are allocated to a payload. Known signals are inserted in preambles (hatched parts in FIG. 7) of a transmission signal. It is assumed that a variable high frequency device according to this embodiment includes a capacitor or an inductor using Electro Micro System (EMS), and the EMS is capable of varying impedance fast in approximately 4 $\mu$s. In the exemplary embodiment, the evaluation function E is calculated every time a preamble is obtained. Thus, time points at which impedance is updated according to this embodiment are the time point at which a first symbol ends, the time point at which a second symbol ends, . . . , and it is possible to update the impedance twice for each frame of 20 $\mu$s. Accordingly, it is possible to update impedance for 18 times with respect to 9 frames. On the other hand, with the conventional technique as shown in FIG. 2, the impedances of the four devices are updated at a time at the rate of once in 180 $\mu$s (9 frames) as mentioned above. Thus, according to this embodiment, it is possible to increase the speed of adaptive control by frequently updating the impedance for each device.

In this embodiment, in light of increasing the speed of adaptive control, the evaluation function E is calculated every time a preamble arrives (for each frame) and impedance of a variable high frequency device is varied. However, in an operation environment where it is possible to reduce the frequency with which impedance is varied, it is not always necessary to update the impedance for each frame. It is possible to update the impedance at desired intervals such as every two frames and every three frames.

Figure 8:
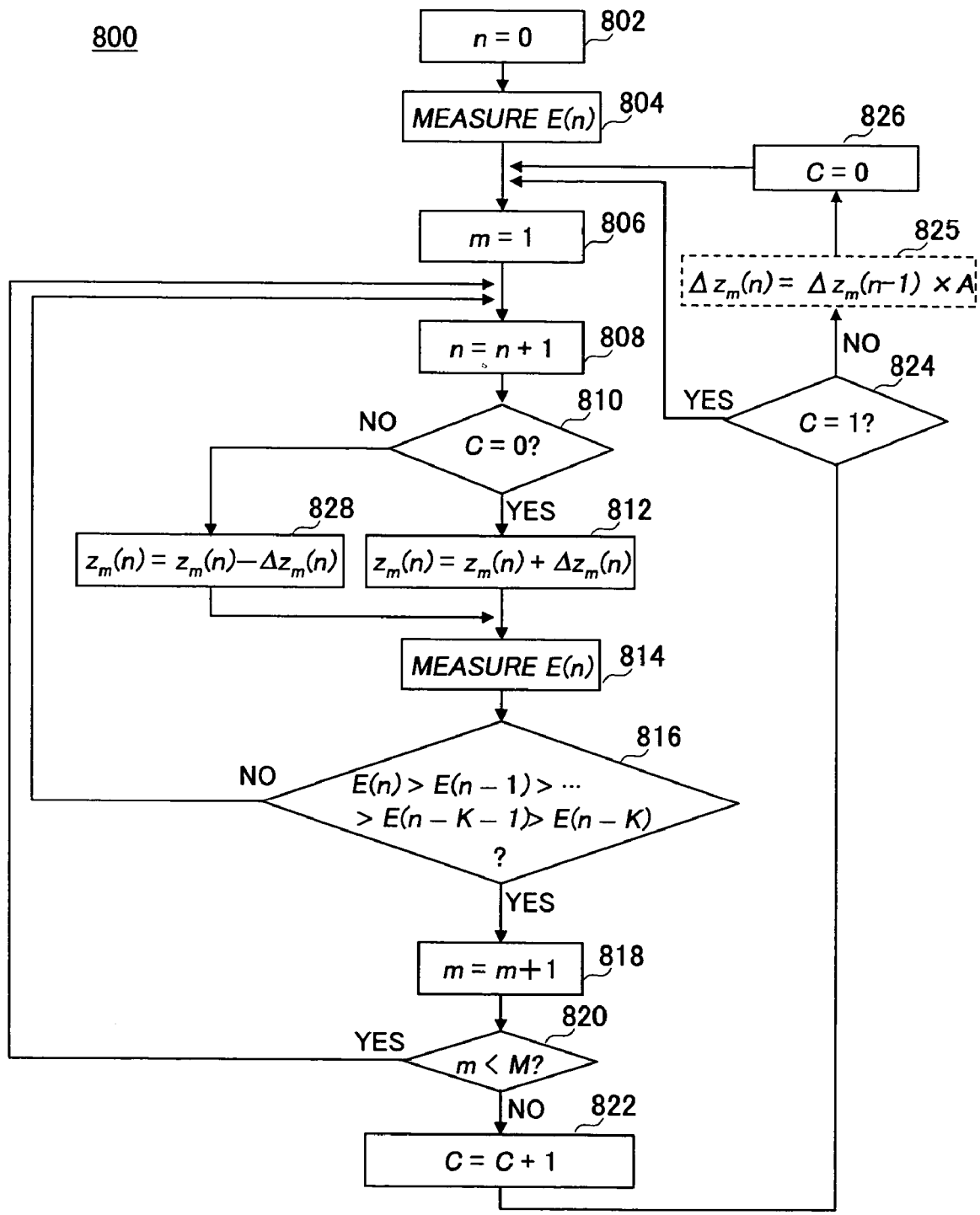
FIG. 8 is a flow chart showing an operation of an adaptive control system according to another embodiment.

FIG. 8 is a flow chart showing a control flow 800 of an adaptive control system according to another embodiment. Similarly to the control flow 500 shown in FIG. 5, impedances of the four variable high frequency devices (M=4) are controlled such that the evaluation function E is minimized. In step 802, the frame number n is set to the initial value 0 (n=0).

In step 804, the value of the evaluation function E (E(n=0)) is calculated.

In step 806, among the four variable high frequency devices, the first device is designated (m=1).

In step 808, the frame number n is incremented by 1.

In step 810, it is determined whether the value c of the increase/decrease counter is 0. The value c of the increase/ decrease counter in this embodiment is 0 or 1. As is described below, c=0 represents that the direction in which impedance is varied is the increase direction, and c=1 represents that the direction in which the impedance is varied is the decreasing direction. Since the value c of the increase/decrease counter is 0 in the initial state (YES in step 810), the flow proceeds to step 812.

In step 812, the impedance of a variable high frequency device that is currently being designated is increased by a predetermined amount that is set in the step size adjusting part 312 (FIG. 3). For simplicity, it is assumed that the variation $\Delta z_m$ of the impedance in this embodiment is a constant value irrespective of variable high frequency devices and frames.

In step 814, the value of the evaluation function E is calculated. With the operation in step 812, among the M variable high frequency devices, the impedance of the first variable high frequency device is varied by $\Delta z_m$. Resulting from this impedance variation, a digital received signal is also varied, and the value of the evaluation function E at this time is calculated.

In step 816, it is determined whether the value of the evaluation function E is varied in a desired direction (in this embodiment, a decreasing direction). Similarly to step 516 shown in FIG. 5, also in step 816, the impedance $z_m$ of the "m"th variable high frequency device is continuously varied until the value of the evaluation function E is increased for K times in a consecutive manner (until the condition (A) is satisfied). In this embodiment K=2. When the condition (A) is satisfied (YES in step 816), the flow proceeds to step 818.

In step 818, the value of m is increased by 1, and another variable high frequency device (m=2) is designated.

In step 820, it is determined whether the current value of m is less than the maximum value M. When the value of m is less than the maximum value M (YES in step 820), the flow returns to step 808, and the impedance $z_2$ of another variable high frequency device is increased as in the case of the impedance $z_1$ of the variable high frequency device. When impedances of all variable high frequency devices are varied, the value of m becomes larger than the maximum value M (NO in step 820). In such case, the flow proceeds to step 822.

In step 822, the value c of the increase/decrease counter is incremented by 1. Consequently, in the current case, the value c becomes 1 (c=1).

In step 824, it is determined whether the value c of the increase/decrease counter is equal to 1. When c=1 (YES in step 824), the flow proceeds directly to step 806. When the value c is not equal to 1 (c=2)(NO in step 824), the value c of the increase/decrease counter is reset to 0, and the flow proceeds to step 806. In the current case, c=1. Step 825, which is a selective step, is described later.

In step 806, the first variable high frequency device (m=1) is designated again.

In step 808, the frame number n is updated.

In step 810, it is determined whether the value c of the increase/decrease counter is 0. Since c=1 in the current case (NO in step 810), the flow proceeds to step 828.

In step 828, the impedance of the variable high frequency device that is currently being designated is decreased for a predetermined amount that is set in the step size adjusting part 312 (FIG. 3). For simplicity, it is assumed that the variation $\Delta z_m$ of impedance in this embodiment is a constant value irrespective of devices and frames.

In step 814, the value of the evaluation function E is calculated. With the operation in step 828, among the four variable-high frequency devices (M=4), the impedance $z_m$ of the first variable high frequency device is varied by $\Delta z_m$. Resulting from this impedance variation, a digital received signal is also varied, and the value of the evaluation function E at this time is calculated.

In step 816, the impedance $z_m$ of the "m"th variable high frequency device is varied until the value of the evaluation function E is increased twice in a consecutive manner (until the condition (A) is satisfied). When the condition (A) is satisfied (YES in step 816), the flow proceeds to step 818.

In step 818, the control flow 800 increases the value of m by 1 and designates another variable high frequency device (m=2).

In step 820, it is determined whether the current value of m is less than the maximum value M. When the value of m is less than the maximum value M (YES in step 820), the flow returns to step 808, and the impedance $Z_2$ of another variable high frequency device is increased as in the case of the impedance $z_1$ of the variable high frequency device. When the impedances of all variable high frequency devices are varied, the value of m becomes larger than M (NO in step 820). In such case, the flow proceeds to step 822.

In step 822, the value c of the increase/decrease counter is incremented by 1. In the current case, the value c becomes 2 (c=2).

In step 824, it is determined whether the value c of the increase/decrease counter is equal to 1. When c=1 (YES in step 824), the flow proceeds directly to step 806. When the value c is not equal to 1 (c=2)(NO in step 824), the value c of the increase/decrease counter is reset to 0 in step 826, and the flow proceeds to step 806. In the current case, c=2.

In the aforementioned manner, the impedances of the variable high frequency devices are controlled. In this embodiment, after increasing the impedance of one variable high frequency device, the impedance of another variable high frequency device is increased. After increasing the impedances of all variable high frequency devices, the value c of the increase/decrease counter is increased, and the impedances of the variable high frequency devices are decreased sequentially from the first variable high frequency device.

In the above-mentioned embodiment, it is assumed that the variation $\Delta z_m$ of impedance is a constant value. However, the variation $\Delta z_m$ may be a value that is varied depending on, for example, the frame number n or the particular kind of variable high frequency device. It is possible to reduce the variation $\Delta z_m$ every time the value of impedance is updated, for example. Thereby, it is possible to improve stability of convergence by increasing the convergence speed with a large variation or a step size $\Delta z_m$ (n) at first, and then decreasing the step size $\Delta z_m$ (n). It is possible to set the step size $\Delta z_m$ (n) as follows, for example.

$$\Delta z_m(n) = \Delta z_m(n-1) \times A, \ 0 < A \leq 1$$

Figure 14:
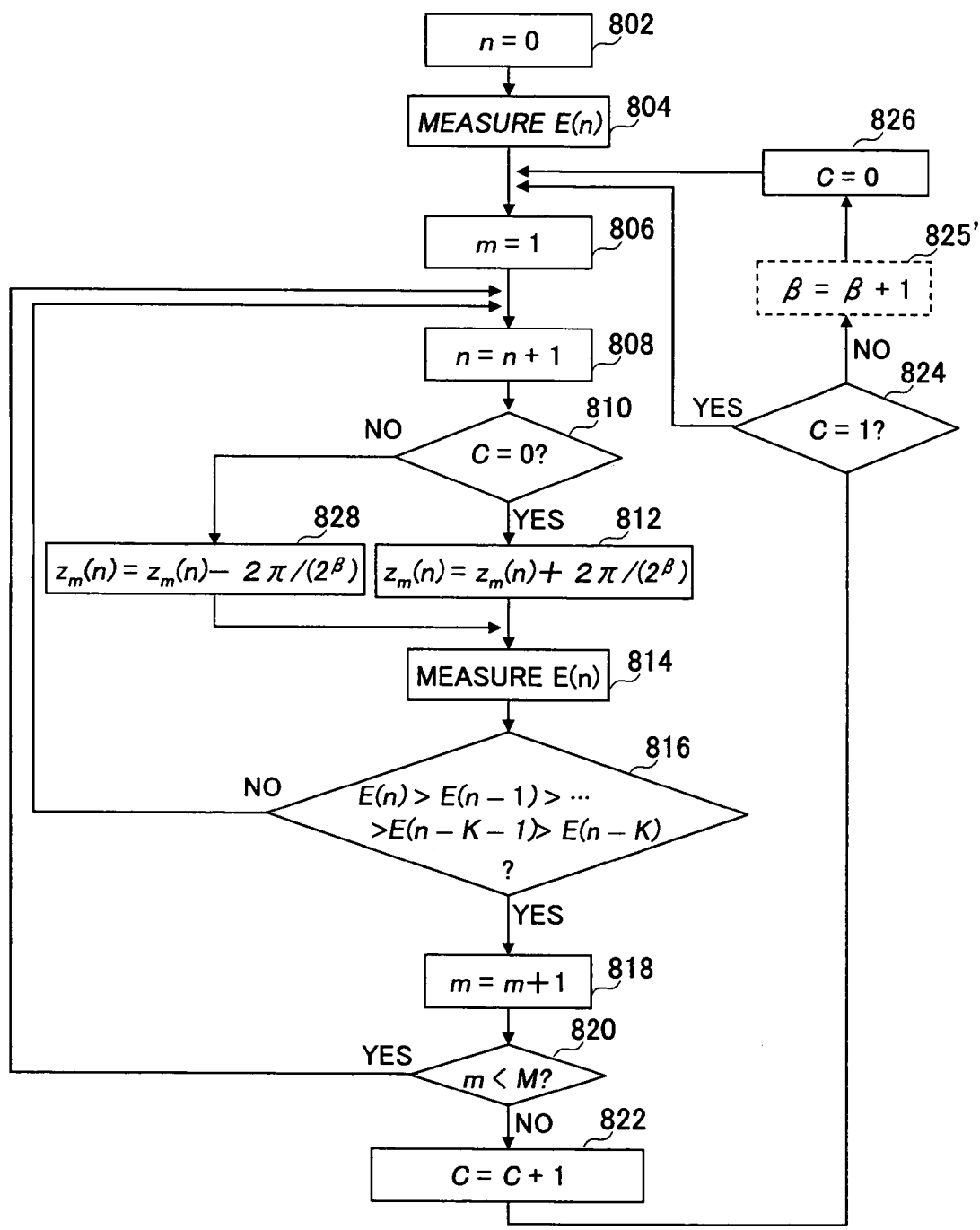
FIG. 14 is a flow chart showing an operation of an adaptive control system according to another embodiment of the present invention.

Such an operation for adjusting the variation $\Delta z_m$ may be performed in the selective step 825 that is indicated by a block shown by a broken line in FIG. 8. Alternatively, unlike step 825 where the variation $\Delta z_m$ is calculated, it is possible to update a parameter defining the variation $\Delta z_m$ as indicated by step 825' in FIG. 14. In FIG. 14, the variation $\Delta z_m$ of impedance in steps 812 and 828 is represented by $2\pi/(2^\beta)$ (radian). It should be noted that the parameter $\beta$ is a natural number (more generally, an actual number of 1 or more). In step 825', the value of the parameter $\beta$, which defines the variation $\Delta z_m$, is updated. It is possible to associate the parameter $\beta$ with the bit width of a digital phase shifter. Additionally, the update frequency of the frame number n and that of the variation $\Delta z_m$ may be matched or different. It is also possible to select whether to vary the variation $\Delta z_m$ in accordance with the condition of convergence (i.e., whether to carry out the selective step 825 (FIG. 8) or 825' (FIG. 14)). In any case, it is possible to improve convergence of impedance by gradually decreasing the value of the variation $\Delta z_m$ of impedance from coarse to fine.

The variation $\Delta z_m$ or the variation of the variation $\Delta z_m$ may be an arbitrary appropriate value. However, when the impedance of a variable high frequency device using the EMS is greatly varied, unnecessary overshoot or undershoot may be generated until a desired value is reached. Accordingly, it is desirable that the variation of impedance be set within a range where such unnecessary variation does not occur. In a case where the magnitude (absolute value) of impedance and the phase are both varied, it is necessary to define the variation of the magnitude and the variation of the phase respectively.

The operation for varying the variation $\Delta z_m$ at fixed intervals or odd intervals is not limited to the embodiment relating to FIG. 8. It is possible, for example, to perform the operation in the embodiment shown in FIG. 5 and other embodiments.

FIG. 9 shows states where the impedance $z_i$ (the upper portion of FIG. 9) and the value of the evaluation function E (the lower portion of FIG. 9) are varied in accordance with the control flow 900 shown in FIG. 8. The horizontal axis represents time or the number of frames. As shown in FIG. 9, the impedance of $z_1$ of the first variable high frequency device is increased until the value of the evaluation function E is increased twice in a consecutive manner. At time $t_1$, when the condition (A) is satisfied, the impedance $z_2$ of the second variable high frequency device is increased. At time $t_2$, when the condition (A) is satisfied, the impedance $z_3$ of the third variable high frequency device is increased. At time $t_3$, when the condition (A) is satisfied, the impedance $z_4$ of the fourth variable high frequency device is increased. The process thus far corresponds to the process in the case where the value c of the increase/decrease counter is 0 in the control flow 800 shown in FIG. 8.

After increasing the impedances of all of the four variable high frequency devices, the value c of the increase/decrease counter is incremented in step 822, and then the first variable high frequency device (m=1) is designated again in step 806. This time, since the value c of the increase/decrease counter is 1, the impedances of the variable high frequency devices are decreased. That is, the impedance $z_1$ of the first variable high frequency device is decreased until the value of the evaluation function E is increased twice in a consecutive manner. At time $t_5$, when the condition (A) is satisfied, the impedance $z_2$ of the second variable high frequency device is decreased. Thereafter, the impedances of all variable high frequency devices are decreased in similar manners.

In the embodiment shown in FIGS. 5 and 6, after increasing and decreasing one variable high frequency device, the impedance of the next variable high frequency device is varied. Increasing the impedance of one variable high frequency device and then immediately decreasing the impedance (while not varying the impedances of the other variable high frequency devices) corresponds to returning the value of the evaluation function E to the original value. This represents an operation of decreasing impedance that is excessively increased and causing the impedance to be close to an optimum value. Accordingly, the embodiment shown in FIGS. 5 and 6 is suitable for an operation environment where behavior of the impedance of each device affects the value of the evaluation function E a relatively great deal (for example, when the number of devices that are subject to control is small).

On the other hand, in the embodiment shown in FIGS. 8 and 9, the impedances of the variable high frequency devices are adjusted by carrying out the cycle in which the impedances of all variable high frequency devices are decreased, after the cycle for increasing the impedances of all variable high frequency devices ends. Also in this case, regarding one variable high frequency device, the operation for decreasing impedance is performed after the operation for increasing the impedance. Thus, even if the impedance of one variable high frequency device is decreased, it is not always true that the value of the evaluation function E is returned to the original value. This embodiment is suitable for an operation environment where general behaviors of the impedances of a plurality of devices affect the value of the evaluation function E relatively great deal (for example, when the number of devices that are subject to control is large.

Figure 10:
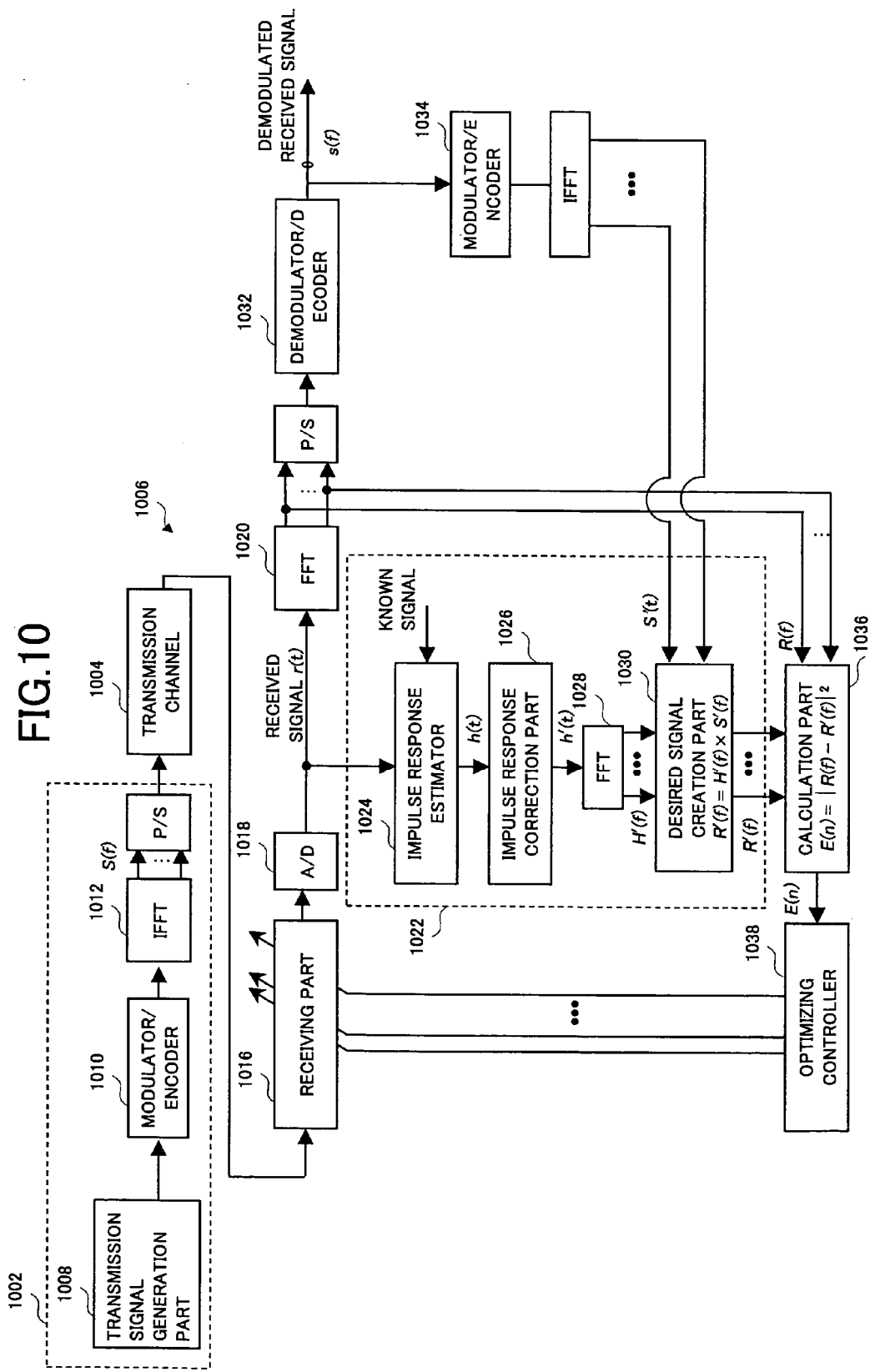
FIG. 10 is a block diagram showing an OFDM transmission system according to another embodiment of the present invention.

FIG. 10 shows an embodiment in which an adaptive controller as shown in the above-mentioned embodiments is applied to a wireless receiver of an Orthogonal Frequency Division Multiplexing system (OFDM). FIG. 10 shows exemplary blocks that relate to the present invention. The system includes a wireless transmitter 1002, a transmission channel 1004, and a wireless receiver 1006. The wireless transmitter 1002 includes a transmission signal generation part 1008 that creates a transmission signal S(t) of a data symbol sequence for wireless transmission. The wireless transmitter 1002 also includes a modulator/encoder 1010 connected to an output of the transmission signal generation part 1008. The modulator/encoder 1010 performs modulation such as PSK modulation or QAM, error correction coding, and the like. The wireless transmitter 1002 also includes a conversion part (IFFT part) 1012 connected to an output of the modulator/encoder 1010. The IFFT part 1012 performs inverse fast Fourier transform. An output signal (multi-carrier signal) of the IFFT part 1012 is received by a receiving part 1016 of the wireless receiver 1006 via a wireless part (not shown) and the transmission channel 1004 after being subjected to parallel-serial conversion.

The receiving part 1016 is a circuit including a plurality of variable high frequency devices, and forms an adaptive array antenna, for example. The wireless receiver 1006 includes an analog to digital (A/D) converter 1018 connected to an output of the receiving part 1016. The wireless receiver 1006 also includes a fast Fourier transform (FFT) part 1020 connected to an output of the A/D converter 1018.

Figure 11:
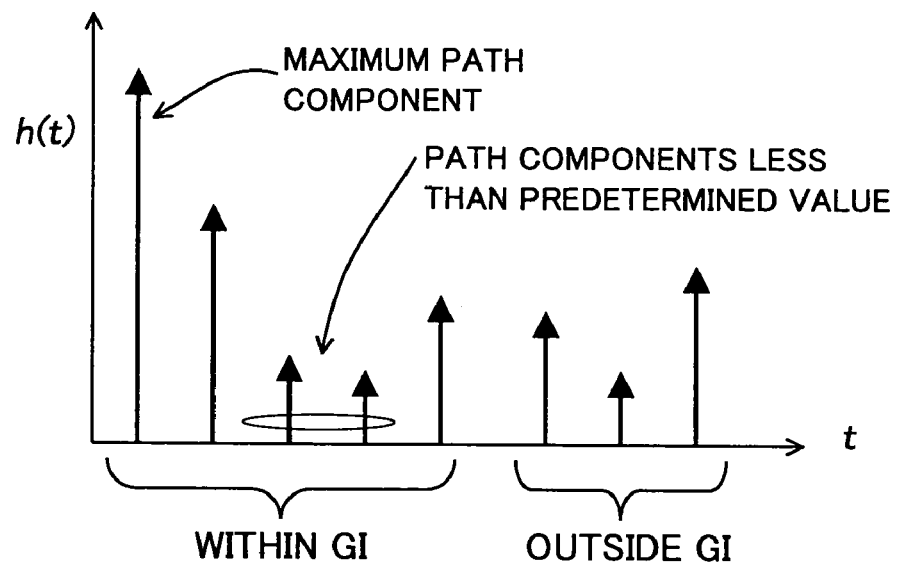
FIG. 11 is a schematic diagram showing the concept of an impulse response.
Figure 12:
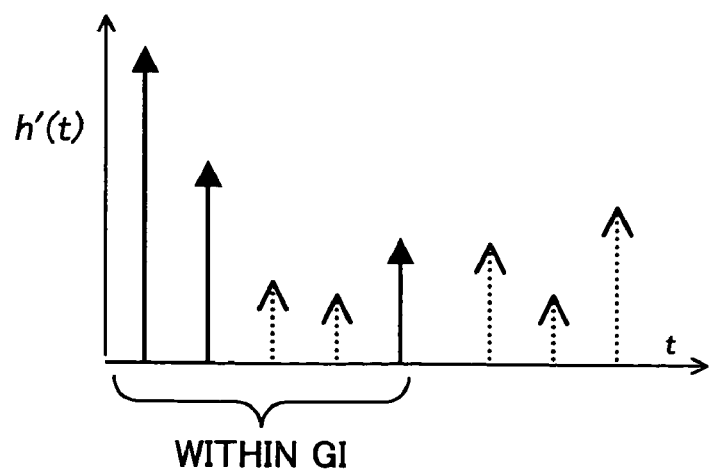
FIG. 12 is a schematic diagram showing the concept of a corrected impulse response.

The wireless receiver 1006 also includes a transmission signal estimator 1022 connected to an output of the A/D converter 1018. The transmission signal estimator 1022 includes an impulse response estimator 1024 connected to an output of the A/D converter 1018. The impulse response estimator 1024 estimates an impulse response h(t) with respect to the transmission channel 1004 based on a received signal r(t) and a known signal. The impulse response h(t) includes various path components that reach over a predetermined time range as shown in FIG. 11, for example. The transmission signal estimator 1022 also includes an impulse response correction part 1026 that corrects an impulse response estimated in the impulse response estimator 1024. The impulse response correction part 1026 creates a desired impulse response h(t)' as shown in FIG. 12, for example, by removing a part of the various path components included in the impulse response h(t). The path components to be removed include, for example, a path component that arrives with a delay over a guard interval GI, and a path component that is less than a predetermined power level (for example, a path component that is less than 20% of the maximum level) in the impulse response h(t), for example. Such path components are represented by dotted arrows in FIG. 12.

The transmission signal estimator 1022 also includes a fast Fourier transform part (FFT part) 1028 that is connected to an output of the impulse response correction art 1026 and performs fast Fourier transform. The FFT part 1028 performs a Fourier transform on an impulse response h'(t) of a corrected time domain and generates a transfer function H'(f) of a frequency domain. The transmission signal estimator 1022 also includes a desired signal creation part 1030 connected to an output of the FFT part 1028. The desired signal creation part 1030 creates a desired signal R'(f) based on the transfer function H'(f) of the frequency domain and a reference signal S'(f) of the frequency domain. The desired signal R'(f) represents a signal that is supposed to be received when the reference signal S'(f) is transmitted through the transmission channel 1004 as being affected by an ideal transfer function H'(f) as shown in FIG. 12.

The wireless receiver 1006 also includes a demodulator/decoder 1032 connected to an output of the FFT part 1020. The demodulator/decoder 1032 outputs a demodulated signal that is accurately restored by performing PSK/QAM demodulation and error correction. The wireless receiver 1006 also includes a modulator/encoder 1034 connected to the demodulator/decoder 1032. The modulator/encoder 1034 creates a replica of a transmitted signal by modulating/encoding again a demodulated received signal, and inputs the replica to the desired signal creation part 1030 as the reference signal S'(f).

The wireless receiver 1006 also includes a calculation part 1036 that is connected to the transmission signal estimator 1022. The calculation part 1036 calculates a predetermined evaluation function E(n). In this embodiment, the evaluation function E represents the square of the absolute value of the difference between the multicarrier received signal R(f) and the desired signal R'(f). The wireless receiver 1006 further includes an optimizing controller 1038 connected to an output of the calculation part 1036. The optimizing controller 1038 adaptively controls impedances of the variable high frequency devices of the receiving part 1016 such that the evaluation function E(n) becomes smaller.

According to this embodiment, it is possible to use a demodulated signal that is subjected to error correction in the demodulator/decoder 1032 and restored with a high degree of accuracy as the reference signal in calculation of the evaluation function E(n). Hence, it is possible to calculate the evaluation function E(n) prior to arrival of preambles.

Figure 13:
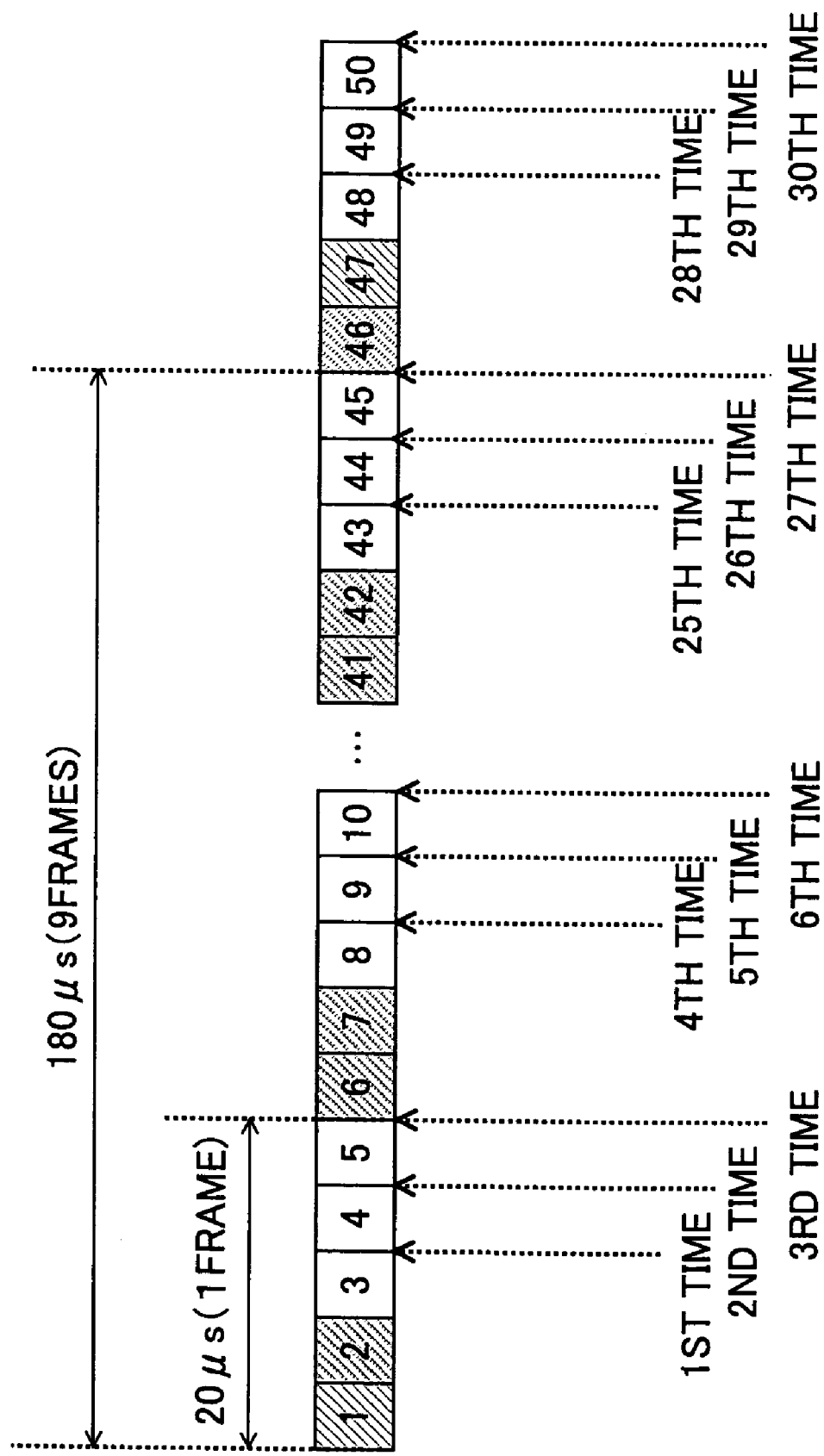
FIG. 13 is a schematic diagram showing time points at which impedance is updated according to another embodiment of the present invention.

FIG. 13 is a schematic diagram showing time points at which impedance is updated according to this embodiment. As previously mentioned with reference to FIG. 7, one frame of 20 μs includes 5 symbols of 4 μs: 2 symbols are allocated to a preamble (8 μs), and the subsequent 3 symbols (12 μs) are allocated to a payload. Known signals are inserted into preambles (hatched parts in FIG. 13) of a transmission signal. It is assumed that a variable high frequency device according to this embodiment includes a capacitor or an inductor using the Electro Micro System (EMS), and the EMS is capable of varying impedance fast in approximately 4 μs.

In this embodiment, the value of the evaluation function E is calculated in payloads other than preambles. Thus, time points at which impedance is updated are the time point at which a third symbol ends, the time point at which a fourth symbol ends, the time point at which a fifth symbol ends, . . . . Consequently, it is possible to update the impedance three times per frame of 20 μs. Accordingly, it is possible to update the impedance 27 times for 9 frames. On the other hand, with the conventional technique as shown in FIG. 2, the impedances of the four variable high frequency devices are updated at a time at the rate of once in 180 μs (9 frames) as mentioned above. Hence, according to this embodiment, it is possible to frequently update the impedance of each device, and further increase the speed of adaptive control.

As mentioned above, according to the embodiments of the present invention, it is possible to cause each variable high frequency device to be close to the optimum value one by one and increase the speed of adaptive control. In this respect, this embodiment is different from conventional methods in which a gradient vector is calculated with respect to a large number of variable high frequency devices and thereafter the impedances of the variable high frequency devices are updated at the same time. Conventional methods require a long time since it is necessary to calculate a gradient vector by increasing and decreasing impedances of all devices so as to update the impedances of the devices for a single time. The embodiments of the present invention do not require such a gradient vector. Hence, it is possible to update impedance quickly.

According to one embodiment of the present invention, when sequentially obtained three or more scalar function values are continuously increased or decreased, the determination part reports to the impedance variation part that a predetermined condition is satisfied. By comparing sequentially obtained K values, it is possible to control influence of noise, for example, and to determine the variation of the scalar function value with a high degree of accuracy. The value of K may be varied depending on the amount of noise included in a signal that is varied in accordance with the impedance. Hence, it is possible to reduce a calculation load while considering influence of noise, for example. In terms of further controlling influence of noise, for example, it is also productive to use an average value E'(n) of a plurality of scalar function values as represented by the following equation.

$$E'(n)=(E(n)+E(n-1)+\ldots+E(n-K+1))/K$$

It should be noted that "n" represents the frame number. Additionally, as represented by the following equation, it is also advantageous to obtain a linear combination by using a forgetting factor α.

$$E'(n)=\alpha E'(n-1)+(1-\alpha)E(n)$$

The forgetting factor α may be a value that satisfies $0 \leq \alpha \leq 1$, such as 0.9.

In addition, instead of comparing consecutive three or more scalar function values, it is also possible to determine whether the difference between the previously obtained scalar function value and the scalar function value of a present time exceeds a predetermined value. Further, it is also possible to determine whether the difference between the average value of previously calculated scalar function values and the average value of scalar values calculated at present time exceeds a predetermined value.

An adaptive controller according to a variation of the present invention includes the step size adjusting part that is connected to the impedance variation part and that adjusts the variation of the impedances of the variable high frequency devices. The variation of the impedances may be a value that is varied depending on the frame number n or the kinds of variable high frequency devices, or a constant value that does not depend on the frame number n or the kinds of variable high frequency devices.

According to another embodiment of the present invention, each variable high frequency device is caused to be close to the optimum value one by one. Thus, it is possible to use a common signal form converter (a D/A converter, for example) among a plurality of variable high frequency devices. With conventional methods, the impedances of all variable high frequency devices are updated in a single time in step 222. Thus, it is necessary to prepare the same number of signal form converters as the number of variable high frequency devices. Accordingly, the embodiment is advantageous also in terms of simplification of the apparatus.

According to another embodiment of the present invention, the plurality of variable high frequency devices are connected to the antenna elements forming the adaptive array antenna. The present invention may be applied to an arbitrary adaptive control system as well as the adaptive array antenna. However, there is an especially strong demand for mobile communication apparatuses (particularly, small mobile communication apparatuses) to perform fast adaptive control while controlling electric power consumption. The embodiment of the present invention is suitable for adaptive control of a variable high frequency circuit used in such a small mobile communication apparatus.

According to another embodiment of the present invention, the reference signal used in the calculation part is formed by a demodulated signal subjected to error correction. By using a demodulated signal that is subjected to hard decision and restored with a high degree of accuracy, it is possible to perform calculation in the calculation part, for example, without waiting for a known signal included in preambles. Hence, it is possible to update the impedances of the variable high frequency devices during pay loads following respective preambles. Consequently, time points (timings) at which update can be performed are increased.

In the above-mentioned embodiments of the present invention, in a case where the impedances of the variable high frequency devices are varied, the impedances are increased at first, and then decreased. However, such an embodiment is not a limitation of the present invention. It is also possible to decrease the impedances at first, and then increase the impedances. Further, it is also possible to increase the impedances of a part of the variable high frequency devices and decrease the impedances of the other variable high frequency devices at first.

In the above-mentioned embodiments of the present invention, the description is given of the case where the impedances of the plurality of variable high frequency devices are varied sequentially one by one. However, in consideration of the symmetric property of a control system, for example, it is also possible to vary the impedances of a plurality of devices at the same time (two devices at a time, for example). In such case, however, it is necessary to prepare the same number of signal form converters (D/A converters, for example) as the number of the devices whose impedances are varied at the same time.

According to the present invention, it is possible to form a variable high frequency circuit that is formed by a large number of EMSs and is capable of adaptively varying the operating characteristic at high speed. Such a variable high frequency circuit may be applied to any suitable variable high frequency circuits such as variable bandwidth filters, voltage controlled oscillators (VCO), and variable frequency amplifiers. Generally, the RF part of a mobile terminal is adjusted and fixed to a predetermined communication standard. There are various kinds of communication standards such as 800 MHz, 1.5 GHz, 2 GHz, 2.4 GHz, and IEEE802.11a, and the RF part of a communication terminal may be set to conform to any one of these standards. In order to create a mobile terminal that can be used for a plurality of communication standards, it is generally necessary or desirable to prepare the same number of RF parts as the number of standards to be used. According to the embodiments of the present invention, it is possible to form a variable high frequency circuit that is capable of adaptively varying the operating characteristic at high speed. Hence, it is possible to form a mobile terminal having a simplified configuration that can be used for a plurality of communication standards.

Figure 15:
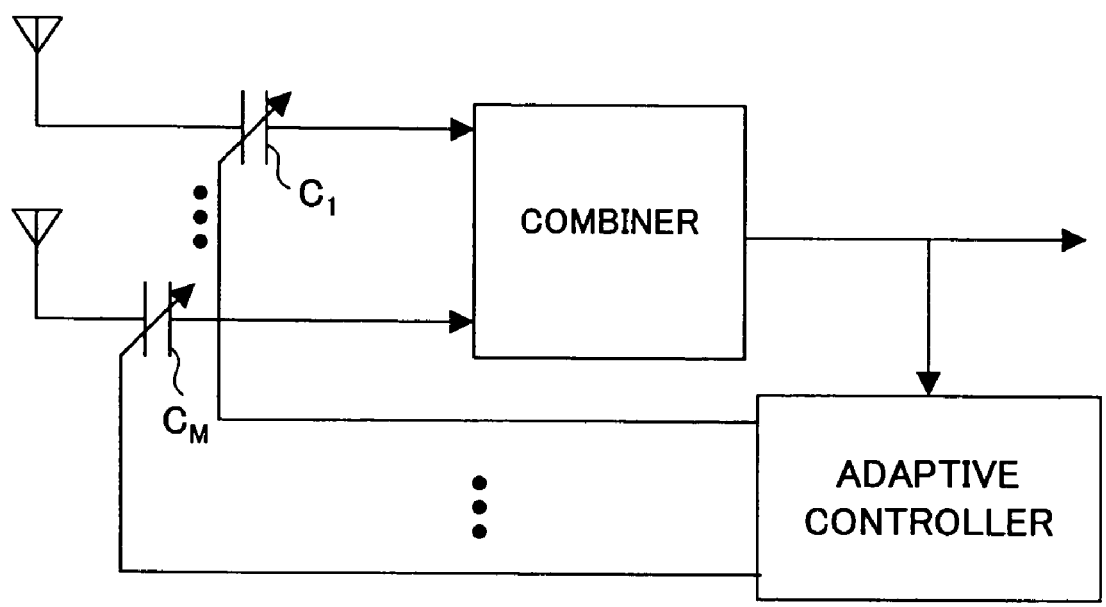
FIG. 15 is a block diagram showing another adaptive control system.

The adaptive controller and the adaptive control method according to the present invention may be applied to various adaptive control systems as well as the above-mentioned embodiments. Generally, it is possible to apply the adaptive controller and the adaptive control method according to the present invention to the adaptive array antenna system as shown in FIG. 1, for example. Alternatively, the present invention may also be applied to a simplified adaptive array antenna system such as shown in FIG. 15. In the embodiment as shown in FIG. 15, variable high frequency devices with respect to M antenna elements to which power is supplied are formed by respective variable capacitance elements $C_1$ through $C_M$ connected to the respective antenna elements in series. Generally, the configuration of a variable high frequency device shows a tendency to be complicated and increased in the size, which contributes to increase costs. In this embodiment, however, it is possible to configure variable high frequency devices very simply, which is advantageous in terms of costs and the like.

When such a configuration of a variable high frequency device is adopted, the phase of each antenna element may be varied only within the range of 0–90° ($-j\infty < (j\omega C)^{-1} < j0$, $\omega$:angular frequency). It is impossible to vary the phase over the total range of 0–360° as in a general variable high frequency device. Accordingly, this embodiment may be functionally disadvantageous in terms of the adjustable phase range. However, even if the range in which the phase may be varied is 0–90°, if the phase is varied to such an extent, in may cases, it is possible to perform in a combining part equal gain combining of signals from respective antennas and perform adaptive control. It should be noted that the variable capacitance elements $C_1$ through $C_M$ are used in this embodiment, but technically, variable inductance elements $L_1$ through $L_M$ may also or alternatively used.

According to this embodiment, in exchange for reducing the dynamic range in which the phase is varied to less than 360°, it is possible to simplify the configuration of a variable high frequency device and achieve advantage in costs. This embodiment is especially advantageous when applied to products that require reduction of costs, such as mobile terminals. When the above-mentioned adaptive control method is applied to such a product, it is possible to realize at a low price a communication terminal that is capable of quickly performing adaptive control.

The present invention is not limited to the specifically disclosed embodiments, and variations and modifications may be made without departing from the scope of the present invention.

The present application is based on Japanese priority applications No. 2003-153181 filed on May 29, 2003, No. 2003-308733 filed on Sep. 1, 2003, and No. 2003-395629 filed on Nov. 26, 2003, the entire contents of which are hereby incorporated by reference.

What is claimed is:

1. An adaptive controller for adaptively controlling a plurality of variable high frequency devices, said adaptive controller comprising:
a calculation part that calculates a scalar function value by using a signal varied in accordance with impedances of the variable high frequency devices, a reference signal, and a predetermined scalar function;
an impedance variation part that creates a signal that sequentially varies the impedances of the variable high frequency devices; and
a determination part that, when an impedance of one of the variable high frequency devices is varied, determines whether a direction in which the scalar function value is varied is in a predetermined sloped direction, the impedance variation part comprising:
a first variation part that, when the determination part determines the direction in which the scalar function value is varied is in the predetermined sloped direction, creates a signal that further varies the impedance of said one of the variable high frequency devices in the predetermined sloped direction; and
a second variation part that, when the determination part determines the direction in which the scalar function value is varied is not in the predetermined sloped direction, creates one of a signal that varies the impedance of said one of the variable high frequency devices in a oppositely sloped direction and a signal that varies an impedance of another one of the variable high frequency devices.

2. The adaptive controller as claimed in claim 1, wherein the determination part includes a first determination part that determines whether sequentially obtained three or more scalar function values are continuously increased or continuously decreased.

3. The adaptive controller as claimed in claim 1, wherein the determination part includes a second determination part that determines whether sequentially obtained K scalar function values are continuously increased or continuously decreased, and a value of the K is varied depending on an amount of noise included in a signal that is varied in accordance with the impedance of the one of the variable high frequency devices.

4. The adaptive controller as claimed in claim 1, wherein, when the determination part determines that the direction in which the scalar function value is varied is still not in the predetermined sloped direction after creation of the signal that varies the impedance of the one of the variable high frequency devices in the oppositely sloped direction, the second variation part creates a signal that varies the impedance of the another variable high frequency device.

5. The adaptive controller as claimed in claim 4, wherein the impedance variation part increases and then decreases respective impedances of a part of the variable high frequency devices, and decreases and then increases respective impedances of another part of the variable high frequency devices.

6. The adaptive controller as claimed in claim 1, wherein the impedance variation part sequentially varies the impedances of the variable high frequency devices in one direction, and thereafter creates a signal that sequentially varies the impedances of the variable high frequency devices in another direction.

7. The adaptive controller as claimed in claim 1, further comprising:
a step size adjusting part that adjusts variations of the impedances of the variable high frequency devices.

8. The adaptive controller as claimed in claim 7, wherein at least one variation is varied when an impedance of one of the variable high frequency devices is varied.

9. The adaptive controller as claimed in claim 7, wherein at least one variation is reduced at a fixed ratio when an impedance of one of the variable high frequency devices is varied.

10. The adaptive controller as claimed in claim 1, further comprising:
a common signal form conversion part that supplies to each of the variable high frequency devices a signal that varies the impedance of the variable high frequency device.

11. The adaptive controller as claimed in claim 1, wherein the calculation part outputs to the determination part an average value of a plurality of scalar function values.

12. The adaptive controller as claimed in claim 1, wherein the calculation part outputs to the determination part a linear combination of a plurality of scalar function values calculated by using a forgetting factor.

13. The adaptive controller as claimed in claim 1, wherein the variable high frequency devices are connected to a plurality of antenna elements forming an adaptive array antenna.

14. The adaptive controller as claimed in claim 13, wherein each of the variable high frequency devices is formed by one of a variable capacitance element and a variable inductance element connected in series to a corresponding one of the antenna elements to which power is supplied.

15. The adaptive controller as claimed in claim 1, wherein the reference signal is formed by a demodulated signal subjected to error correction.

16. The adaptive controller as claimed in claim 1, wherein the variable high frequency devices form a high frequency circuit of a mobile communication apparatus.

17. A wireless receiver having the adaptive controller as claimed in claim 1 and obtaining from a radio received signal the signal that is varied in accordance with the impedances of the variable high frequency devices, said wireless receiver comprising:
an impulse response estimator that estimates an impulse response of a transmission channel by using the radio received signal;
a correction part that creates a corrected impulse response by removing a part of paths included in the impulse response;
a demodulator that performs error correction on the received signal and creates a demodulated signal;
a reference signal creation part that creates the reference signal by using the demodulated signal; and
a transmission signal estimator that, by using the corrected impulse response and the reference signal, estimates a transmission signal transmitted to the wireless receiver,
wherein the scalar function value is calculated based on a difference between the received signal and the estimated transmission signal.

18. An adaptive control method of adaptively controlling a plurality of variable high frequency devices, said method comprising the steps of:
varying an impedance of one of the variable high frequency devices;
calculating a scalar function value by using a signal varied in accordance with impedances of the variable high frequency devices, a reference signal, and a predetermined scalar function;

when the impedance of the one of the variable high frequency devices is varied, determining whether a direction in which the scalar function value is varied is in a predetermined sloped direction;

when it is determined that the direction in which the scalar function value is varied is in the predetermined sloped direction, further varying the impedance of the one of the variable high frequency devices in the predetermined sloped direction;

when it is determined that the direction in which the scalar function value is varied is not in the predetermined sloped direction, varying the impedance of the one of the variable high frequency devices in an oppositely sloped direction; and when it is determined that the direction in which the scalar function value is varied is not in the predetermined sloped direction after performing the step of varying the impedance of the one of the variable high frequency devices in the oppositely sloped direction, varying an impedance of another one of the variable high frequency devices.

19. An adaptive control method of adaptively controlling a plurality of variable high frequency devices, said method comprising:

a first step of varying an impedance of one of the variable high frequency devices;

a second step of calculating a scalar function value by using a signal varied in accordance with impedances of the variable high frequency devices, a reference signal, and a predetermined scalar function;

a third step of determining, when the impedance of the one of the variable high frequency devices is varied, whether a direction in which the scalar function value is varied is in a predetermined sloped direction;

a fourth step of further varying, when it is determined that the direction in which the scalar function value is varied is in the predetermined sloped direction, the impedance of the one of the variable high frequency devices in the predetermined sloped direction;

a fifth step of varying, when it is determined that the direction in which the scalar function value is varied is not in the predetermined sloped direction, an impedance of another one of the variable high frequency devices;

a step of sequentially varying the impedances of the variable high frequency devices by repeating the first through fifth steps;

a step of varying the impedance of the one of the variable high frequency devices in an oppositely sloped direction; and a step of sequentially varying the impedances of the variable high frequency devices by repeating the second through fifth steps.

* * * * *